(12) United States Patent
Si et al.

(10) Patent No.: US 12,137,469 B2
(45) Date of Patent: Nov. 5, 2024

(54) METHOD FOR CONFIGURING POSITIONING REFERENCE SIGNAL, NETWORK DEVICE, AND TERMINAL

(71) Applicant: VIVO MOBILE COMMUNICATION CO., LTD., Guangdong (CN)

(72) Inventors: Ye Si, Chang'an Dongguan (CN); Peng Sun, Chang'an Dongguan (CN); Huaming Wu, Chang'an Dongguan (CN); Xiaodong Sun, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 509 days.

(21) Appl. No.: 17/481,594

(22) Filed: Sep. 22, 2021

(65) Prior Publication Data

US 2022/0007354 A1    Jan. 6, 2022

Related U.S. Application Data

(63) Continuation of application No. PCT/CN2020/080367, filed on Mar. 20, 2020.

(30) Foreign Application Priority Data

Mar. 22, 2019  (CN) .................. 201910222312.X

(51) Int. Cl.
  *H04W 72/51* (2023.01)
  *H04L 5/00* (2006.01)
  *H04W 72/23* (2023.01)

(52) U.S. Cl.
  CPC ........... *H04W 72/51* (2023.01); *H04L 5/0007* (2013.01); *H04L 5/0048* (2013.01); *H04W 72/23* (2023.01)

(58) Field of Classification Search
  CPC ................. H04W 72/51; H04W 72/23; H04W 72/0046; H04W 72/0053; H04W 64/00;
  (Continued)

(56) References Cited

U.S. PATENT DOCUMENTS

2016/0334499 A1   11/2016   Fischer
2017/0289973 A1*  10/2017   Yang ..................... H04L 5/0048
(Continued)

FOREIGN PATENT DOCUMENTS

CN    103874207 A    6/2014
CN    107660343 A    2/2018
(Continued)

OTHER PUBLICATIONS

JP Office Action in Application No. 2021-556947 Dated Sep. 27, 2022.
(Continued)

*Primary Examiner* — Chi H Pham
*Assistant Examiner* — Vladislav Y Agureyev
(74) *Attorney, Agent, or Firm* — Brooks Kushman P.C.

(57) ABSTRACT

This application discloses a method for configuring a positioning reference signal, a network device, and a terminal. The method includes: transmitting resource configuration information of a positioning reference signal; and transmitting the positioning reference signal based on a resource pattern indicated by the resource configuration information, where the resource configuration information includes at least one parameter item, a value of the parameter item is one of at least two optional values corresponding to the parameter item, and the resource pattern is related to the value of the parameter item.

19 Claims, 25 Drawing Sheets

(58) Field of Classification Search
CPC ...... H04W 4/02; H04L 5/0007; H04L 5/0048; H04L 5/0023; H04L 5/0026; H04L 5/005; H04L 5/0094

See application file for complete search history.

(56) References Cited

U.S. PATENT DOCUMENTS

| | | | |
|---|---|---|---|
| 2018/0020423 A1 | 1/2018 | Wang et al. | |
| 2019/0181936 A1* | 6/2019 | Park | H04W 76/27 |
| 2019/0191444 A1* | 6/2019 | Park | H04W 72/23 |
| 2020/0137745 A1* | 4/2020 | Bachu | H04L 5/001 |
| 2020/0154239 A1 | 5/2020 | Yamada et al. | |
| 2020/0177353 A1* | 6/2020 | Ding | H04L 5/0094 |
| 2020/0235877 A1* | 7/2020 | Manolakos | H04W 64/00 |
| 2020/0245372 A1* | 7/2020 | Lei | H04L 27/2602 |
| 2020/0274655 A1* | 8/2020 | Zhao | H04L 5/0055 |
| 2021/0006375 A1* | 1/2021 | Takeda | H04W 28/04 |
| 2021/0351887 A1* | 11/2021 | Qi | H04L 5/005 |
| 2021/0385820 A1* | 12/2021 | Shrestha | H04W 72/542 |
| 2021/0392609 A1* | 12/2021 | Siomina | H04W 64/00 |
| 2021/0410097 A1* | 12/2021 | Munier | H04L 5/0053 |
| 2022/0038231 A1* | 2/2022 | Tao | H04L 5/0048 |
| 2022/0086787 A1* | 3/2022 | Ernström | H04L 25/0224 |
| 2022/0095296 A1* | 3/2022 | Franke | G01S 5/0236 |
| 2022/0116089 A1* | 4/2022 | Khoryaev | H04B 7/043 |
| 2022/0123886 A1* | 4/2022 | Munier | G01S 5/0205 |
| 2022/0131727 A1* | 4/2022 | Khoryaev | H04L 27/261 |

FOREIGN PATENT DOCUMENTS

| | | | |
|---|---|---|---|
| CN | 109327901 A | 2/2019 | |
| CN | 109479255 A | 3/2019 | |
| CN | 107911203 B * | 11/2023 | H04B 7/0626 |
| EP | 3633901 A1 * | 4/2020 | H04L 5/001 |
| EP | 3681226 A1 * | 7/2020 | G01S 5/0236 |
| EP | 3667990 B1 * | 6/2022 | H04B 7/0626 |
| EP | 4024743 A1 * | 7/2022 | H04L 5/0048 |
| EP | 3633901 B1 * | 2/2023 | H04L 5/001 |
| EP | 4149038 A1 * | 3/2023 | H04L 27/2611 |
| EP | 4297312 A1 * | 12/2023 | H04L 1/1664 |
| WO | 2018025794 A1 | 2/2018 | |
| WO | WO-2018064537 A1 * | 4/2018 | H04L 27/2611 |
| WO | 2018/093835 A1 | 5/2018 | |
| WO | 2018/144146 A1 | 8/2018 | |
| WO | WO-2018219074 A1 * | 12/2018 | H04L 5/001 |

OTHER PUBLICATIONS

"Discussion on DL only based positioning" 3GPP TSG RAN WG1 Meeting #96, Spreadtrum Communications, R1-1902721, Feb. 25, 2019.

"System level performance with explicit link level simulation for downlink OTDOA and angle based techniques" 3GPP TSG RAN WG1 #96 Meeting, MediaTek, R1-1903331, Feb. 25, 2019.

"Discussions on DL only based Positioning" 3GPP TSG RAN WG1 #96, LG Electronics, R1-1903346, Feb. 25, 2019.

"Summary for NR-Positioning AI—7.2.10.1.1 DL only Based Positioning" Intel Corporation, R1-1903394, 3GPP TSG RAN WG1 Meeting #96, Feb. 25, 2019.

"RAT-dependent DL-only NR positioning techniques" Qualcomm Incorporated, R1-1903018, 3GPP TSG RAN WG1 #96, Feb. 25, 2019.

Written Opinion and International Search Report in Application No. PCT/CN2020/080367 dated Oct. 7, 2021.

EP Search Report in Application No. 20777836.6 Dated May 17, 2022.

"Views on NR downlink positioning techniques" 3GPP TSG RAN WG1 96, Ericsson, R1-1903139, Feb. 25, 2019.

"Downlink Positioning Solutions: design and evaluations" 3GPP TSG RAN WG1 96, Ericsson, R1-1903139, Feb. 25, 2019.

"Discussion on DL and UL RS for NR positioning" 3GPP TSG RAN WG1 #96bis, vivo, R1-1904107, Apr. 8, 2019.

"Remaining issues on DL RS design for NR positioning" 3GPP TSG RAN WG1 #99, vivo, R1-1912044, Nov. 18, 2019.

* cited by examiner

METHOD FOR CONFIGURING POSITIONING REFERENCE SIGNAL, NETWORK DEVICE, AND TERMINAL

CROSS-REFERENCE TO RELATED APPLICATIONS

This application is a continuation application of PCT International Application No. PCT/CN2020/080367 filed on Mar. 20, 2020, which claims priority to Chinese Patent Application No. 201910222312.X, filed in China on Mar. 22, 2019. The disclosures of these applications are incorporated herein by reference in their entireties.

TECHNICAL FIELD

This disclosure relates to the field of communications technologies, and in particular, to a method for configuring a positioning reference signal, a network device, and a terminal.

BACKGROUND

Positioning reference signals (PRS) are reference signals (RS) used for downlink positioning. A terminal performs measurement on PRSs transmitted from a plurality of cells or a plurality of transmission points, and after obtaining a reference signal time difference (RSTD) between the plurality of cells or transmission points, the terminal transmits RSTD information obtained through measurement to a positioning server. The positioning server obtains a location of the terminal through calculation.

In a long term evolution (LTE) system, a PRS may be transmitted on a resource block of a downlink subframe configured for transmission of the positioning reference signal. The PRS features relatively strong autocorrelation and orthogonality; therefore, a highest correlation peak can be easily detected during correlation monitoring, so as to eliminate signal interference from neighboring cells, thereby ensuring precision of observed time difference of arrival (OTDOA) measurement.

In the LTE system, PRS time-frequency resources are mapped according to the following formula:

$$a_{k,l}^{(p)} = r_{l,n_s}(m')$$

For normal cyclic prefix, PRS time-frequency resource mapping, which is also referred to as PRS resource pattern (pattern), is shown in FIG. 1a and FIG. 1b.

$$k = 6(m + N_{RB}^{DL} - N_{RB}^{PRS}) + (6 - l + v_{shift}) \bmod 6$$

$$l = \begin{cases} 3, 5, 6 & \text{if } n_s \bmod 2 = 0 \\ 1, 2, 3, 5, 6 & \text{if } n_s \bmod 2 = 1 \text{ and } (1 \text{ or } 2 \text{ PBCH antenna ports}) \\ 2, 3, 5, 6 & \text{if } n_s \bmod 2 = 1 \text{ and } (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

For extended cyclic prefix, PRS time-frequency resource mapping is shown in FIG. 2a and FIG. 2b.

$$k = 6(m + N_{RB}^{DL} - N_{RB}^{PRS}) + (5 - l + v_{shift}) \bmod 6$$

$$l = \begin{cases} 4, 5 & \text{if } n_s \bmod 2 = 0 \\ 1, 2, 4, 5 & \text{if } n_s \bmod 2 = 1 \text{ and } (1 \text{ or } 2 \text{ PBCH antenna ports}) \\ 2, 4, 5 & \text{if } n_s \bmod 2 = 1 \text{ and } (4 \text{ PBCH antenna ports}) \end{cases}$$

$$m = 0, 1, \ldots, 2 \cdot N_{RB}^{PRS} - 1$$

$$m' = m + N_{RB}^{max,DL} - N_{RB}^{PRS}$$

l represents a time domain symbol (OFDM symbol) number in a slot, $n_s$ represents a slot number in a radio frame, $N_{RB}^{DL}$ represents a downlink bandwidth, or is referred to as a quantity of resource blocks (RB) included in a downlink resource, $N_{RB}^{PRS}$ represents a bandwidth of a positioning reference signal, or is referred to as a quantity of resource blocks included, $N_{RB}^{PRS}$ is configured by a higher layer, $v_{shift}$ represents a cell-specific frequency offset and is obtained through calculation according to $N_{ID}^{cell} \bmod 6$, and $N_{ID}^{cell}$ represents a cell identity. The PRS is usually transmitted periodically. The transmission periodicity may be configured to 160, 320, 640, or 1280 subframes. The PRS may be transmitted in a plurality of consecutive downlink subframes, and the first subframe satisfies the following formula:

$$(10 \times n_f + n_s/2 - \Delta_{PRS}) \bmod T_{PRS}$$

$\Delta_{PRS}$ represents a subframe offset of the PRS, and $T_{PRS}$ represents the transmission periodicity of the PRS. In the LTE system, only the PRS resource pattern described above is supported. In a new radio (NR) system, configurable downlink (DL) PRS time and frequency allocation (Configurable NR DL PRS frequency and time allocation) needs to be supported. Therefore, the PRS resource pattern in the LTE system is no longer applicable.

SUMMARY

Embodiments of this disclosure provide a method for configuring a positioning reference signal, a network device, and a terminal, so as to resolve the problem of configuring a PRS resource pattern in an NR system.

According to a first aspect, an embodiment of this disclosure provides a method for configuring a positioning reference signal, applied to a network device side and including:
  transmitting resource configuration information of a positioning reference signal; and
  transmitting the positioning reference signal based on a resource pattern indicated by the resource configuration information, where the resource configuration information includes at least one parameter item, a value of the parameter item is one of at least two optional values corresponding to the parameter item, and the resource pattern is related to the value of the parameter item.

According to a second aspect, an embodiment of this disclosure further provides a method for configuring a positioning reference signal, applied to a terminal and including:
  receiving resource configuration information of a positioning reference signal, where the resource configuration information includes at least one parameter item, and a value of the parameter item is one of at least two optional values corresponding to the parameter item;
  determining a resource pattern of the positioning reference signal based on the value of the parameter item in the resource configuration information; and receiving the positioning reference signal based on the resource pattern.

According to a third aspect, an embodiment of this disclosure provides a network device, including:

a first transmitting module, configured to transmit resource configuration information of a positioning reference signal; and a second transmitting module, configured to transmit the positioning reference signal based on a resource pattern indicated by the resource configuration information, where the resource configuration information includes at least one parameter item, a value of the parameter item is one of at least two optional values corresponding to the parameter item, and the resource pattern is related to the value of the parameter item.

According to a fourth aspect, an embodiment of this disclosure provides a terminal, including:

a first receiving module, configured to receive resource configuration information of a positioning reference signal, where the resource configuration information includes at least one parameter item, and a value of the parameter item is one of at least two optional values corresponding to the parameter item;

a determining module, configured to determine a resource pattern of the positioning reference signal based on the value of the parameter item in the resource configuration information; and a second receiving module, configured to receive the positioning reference signal based on the resource pattern.

According to a fifth aspect, an embodiment of this disclosure further provides a network device, where the network device includes a processor, a memory, and a program stored in the memory and capable of running on the processor, where when the program is executed by the processor, the steps of the foregoing method for configuring a positioning reference signal according to the first aspect are implemented.

According to a sixth aspect, an embodiment of this disclosure further provides a terminal, where the terminal includes a processor, a memory, and a program stored in the memory and capable of running on the processor, where when the program is executed by the processor, the steps of the foregoing method for configuring a positioning reference signal according to the second aspect are implemented.

According to a seventh aspect, an embodiment of this disclosure provides a computer-readable storage medium. The computer-readable storage medium stores a program, and when the program is executed by a processor, the steps of the foregoing method for configuring a positioning reference signal according to the first aspect or the second aspect are implemented.

In this way, the network device in the embodiments of this disclosure configures the resource configuration information of the positioning reference signal for the terminal, and the value of the parameter item in the resource configuration information is one of the at least two optional values that is selected by the network device, so that the system can support configurable positioning reference signal resource allocation, supporting more flexible resource configuration and improving resource utilization.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may still derive other drawings from these accompanying drawings without creative efforts.

DESCRIPTION OF EMBODIMENTS

The following describes exemplary embodiments of this disclosure in more detail with reference to the accompanying drawings. Although the exemplary embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances so that the embodiments of this application described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, product, or device. Use of "and/or" in the specification and claims represents at least one of connected objects.

Technologies described in this specification are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. Techniques described in this specification may be used in the aforementioned systems and radio technologies, and can also be used in other systems and radio technologies. However, in the following descriptions, an NR system is described for an illustration purpose, and NR terms are used in most of the following descriptions, although these technologies may also be applied to other applications than an NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 1A:
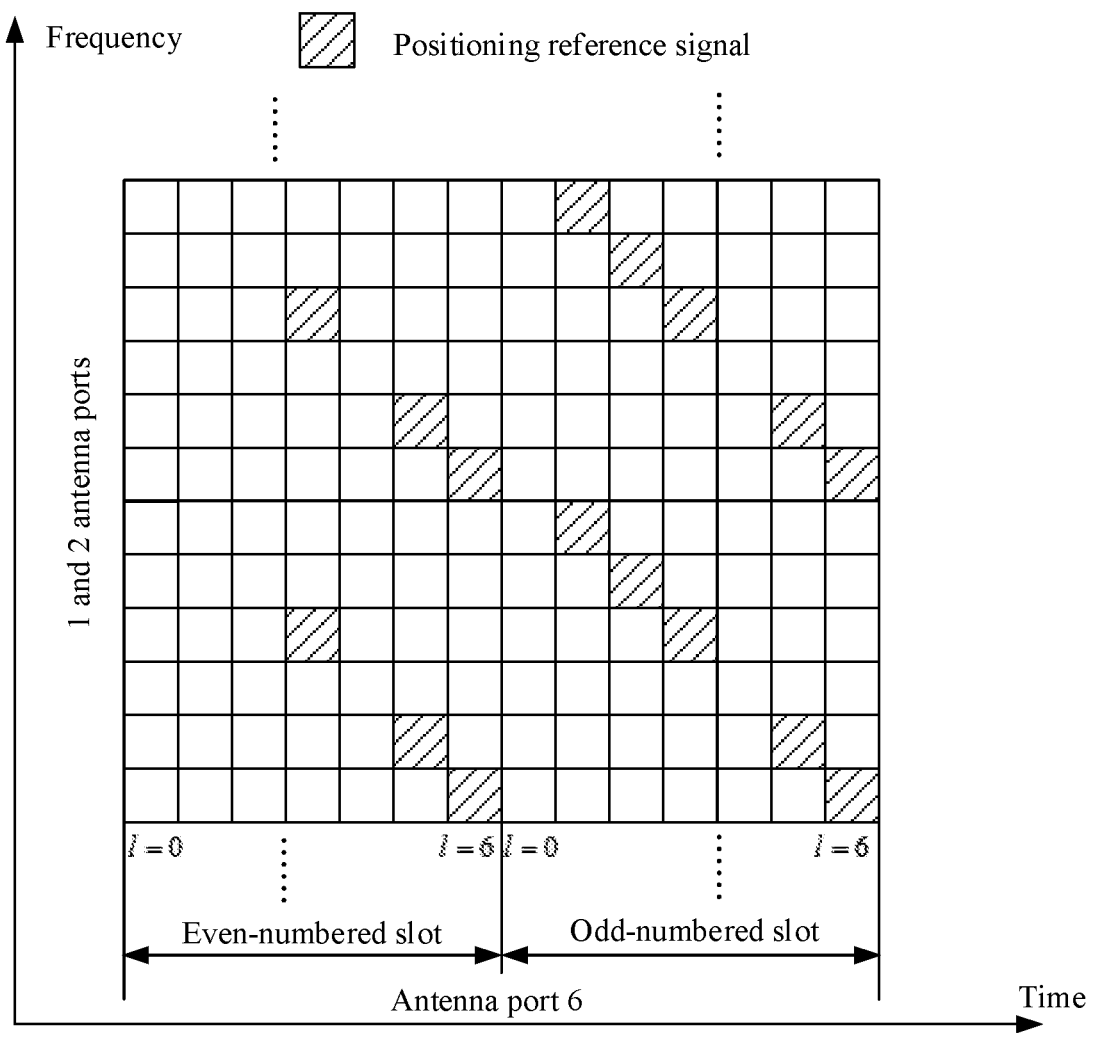
FIGS. 1a and 1b are schematic diagrams of PRS resource patterns for normal cyclic prefix.
Figure 1B:
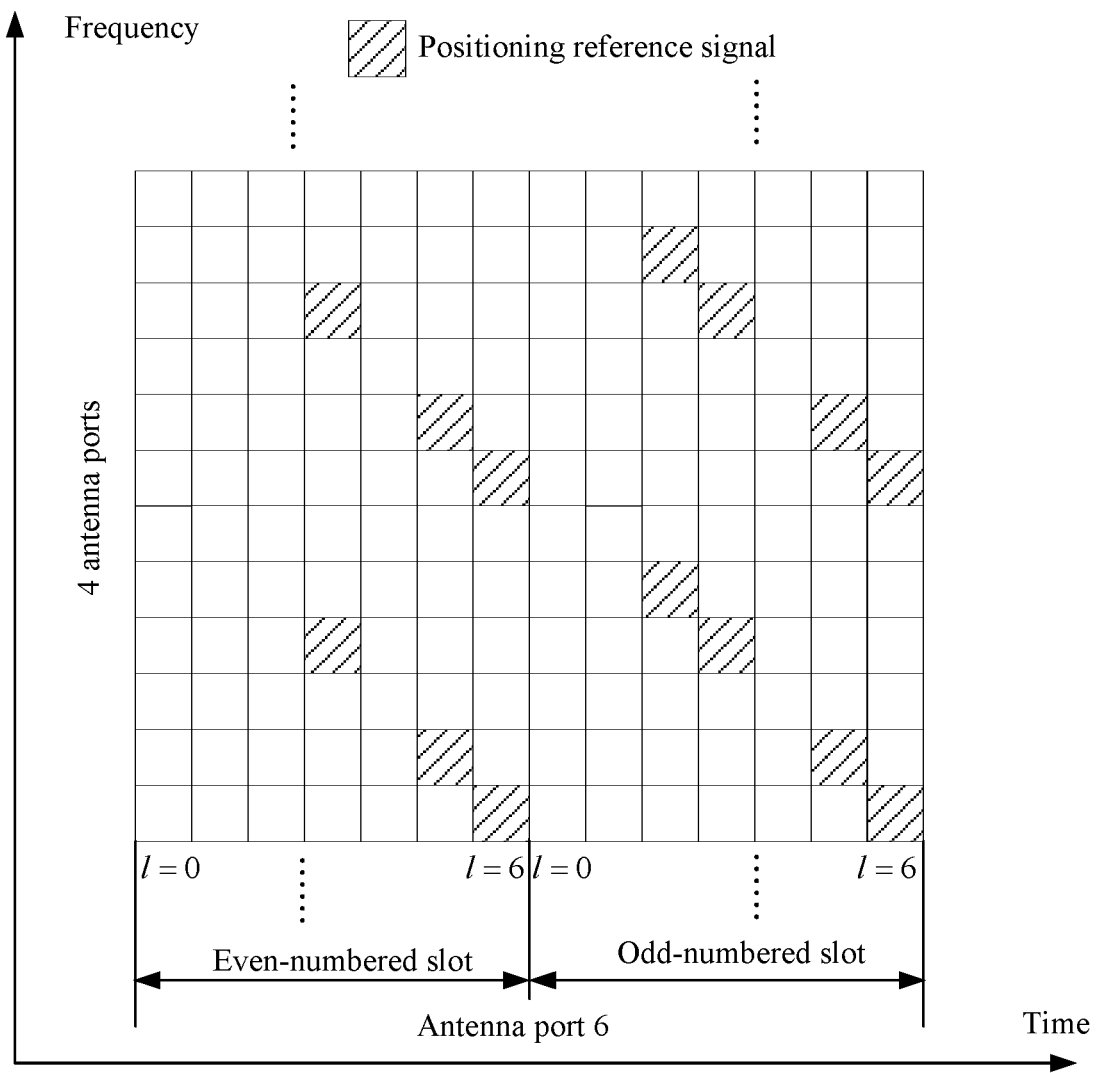
Figure 2A:
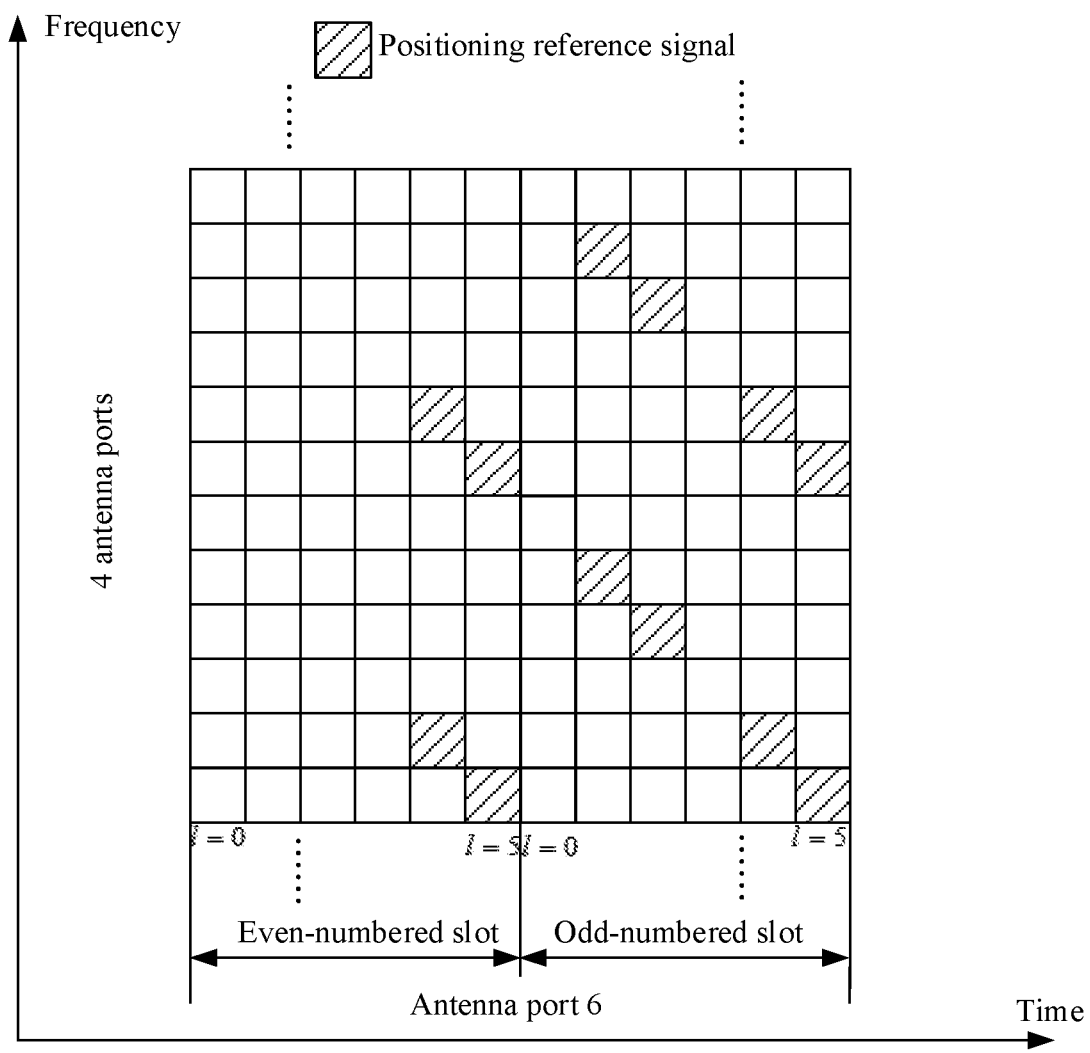
FIGS. 2a and 2b are schematic diagrams of PRS resource patterns for extended cyclic prefix.
Figure 2B:
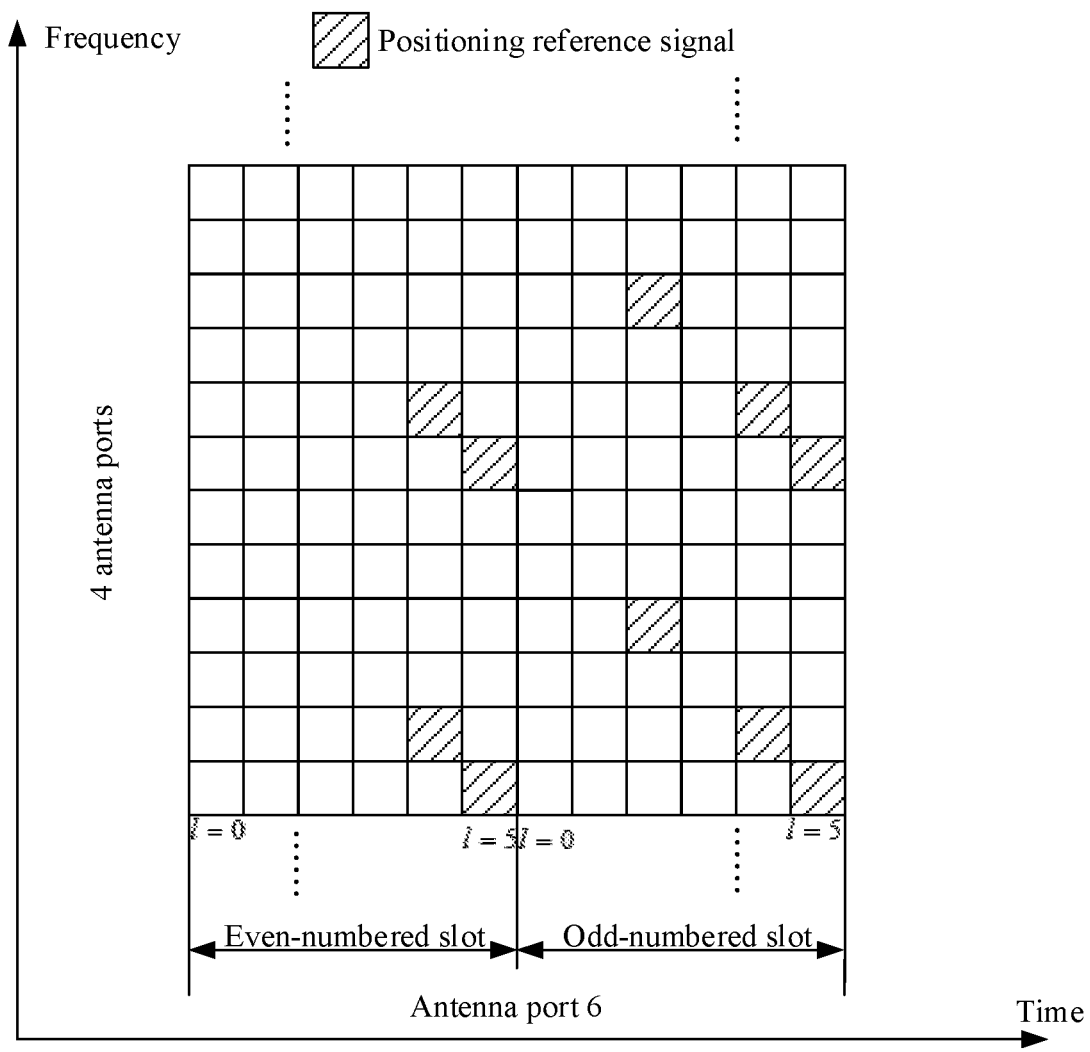
Figure 3:
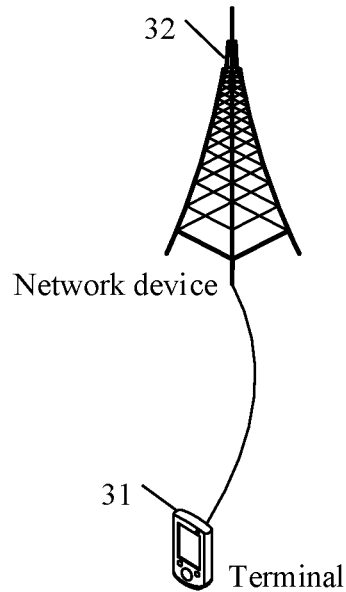
FIG. 3 is a block diagram of a mobile communications system to which the embodiments of this disclosure are applicable.

Referring to FIG. 3, FIG. 3 is a block diagram of a wireless communications system to which the embodiments of this disclosure are applicable. The wireless communications system includes a terminal 31 and a network device 32. The terminal 31 may also be referred to as a terminal device or user equipment (UE). The terminal 31 may be a terminal-side device such as a mobile phone, a tablet computer, a laptop computer, a personal digital assistant (PDA), a mobile Internet device (MID), a wearable device, or an in-vehicle device. It should be noted that a specific type of the terminal 31 is not limited in the embodiments of this disclosure. The network device 32 may be a base station or a core network. The base station may be a 5G base station and a base station of a later version (for example, a gNB or a 5G NR NB), or a base station in another communications system (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specific technical term. It should be noted that in the embodiments of this disclosure, the base station in the NR system is merely used as an example, and a specific type of the base station is not limited.

Under control of a base station controller, the base station may communicate with the terminal 31. In various examples, the base station controller may be a part of the core network or some base stations. Some base stations may perform communication of control information or user data with the core network by using backhauls. In some examples, some of these base stations may communicate with each other directly or indirectly by using backhaul links. The backhaul links may be wired or wireless communications links. The wireless communications system may support operations on multiple carriers (wave signals of different frequencies). A multi-carrier transmitter can transmit modulated signals on the multiple carriers simultaneously. For example, multi-carrier signals modulated by using various radio technologies may be transmitted on each communications link. Each modulated signal may be transmitted on different carriers and may carry control information (for example, a reference signal or a control channel), overhead information, data, and the like.

The base station may perform wireless communication with the terminal 31 by using one or more access point antennas. Each base station may provide communication coverage for a corresponding coverage area of the base station. A coverage area of an access point may be divided into sectors forming only a part of the coverage area. The wireless communications system may include different types of base stations (for example, a macro base station, a micro base station, or a picocell base station). The base station may also use different radio technologies, for example, a cell or WLAN radio access technology. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

A communications link in the wireless communications system may include an uplink for carrying uplink (UL) transmission (for example, from the terminal 31 to the network device 32) or a downlink for carrying downlink (DL) transmission (for example, from the network device 32 to the terminal 31). UL transmission may also be referred to as reverse link transmission, and DL transmission may also be referred to as forward link transmission. Downlink transmission may be implemented by using a licensed band, an unlicensed band, or both. Similarly, uplink transmission may be implemented by using a licensed band, an unlicensed band, or both.

Figure 4:
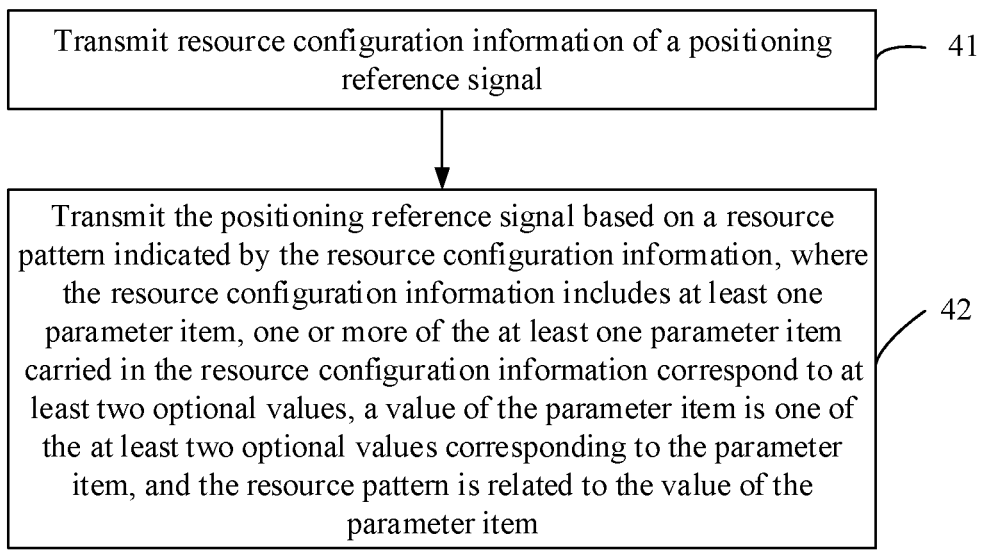
FIG. 4 is a schematic flowchart of a method for configuring a positioning reference signal on a network device side according to an embodiment of this disclosure.

An embodiment of this disclosure provides a method for configuring a positioning reference signal, applied to a network device side. As shown in FIG. 4, the method may include the following steps 41 and 42.

Step 41: Transmit resource configuration information of a positioning reference signal.

The positioning reference signal PRS is used for downlink positioning, and the PRS can be configured in a resource block of a downlink subframe. After configuring a transmission resource for the positioning reference signal, the network device transmits the resource configuration information of the positioning reference signal to the terminal, where the resource configuration information is used to indicate the transmission resource for the positioning reference signal, such as at least one of a frequency domain resource, a time domain resource, a spatial domain resource, and a code domain resource.

Step 42: Transmit the positioning reference signal based on a resource pattern indicated by the resource configuration information, where the resource configuration information includes at least one parameter item, a value of the parameter item is one of at least two optional values corresponding to the parameter item, and the resource pattern is related to the value of the parameter item.

The resource configuration information may include at least one parameter item related to the transmission resource of the positioning reference signal. A resource pattern, also referred to as a PRS resource pattern, is related to the value of the parameter item, and different values of a parameter item correspond to different resource patterns. At least one of the parameter items carried in the resource configuration information corresponds to at least two optional values. It is assumed that the parameter items carried in the resource configuration information include: a parameter item 1 and a parameter item 2, and at least one parameter item of the parameter item 1 and the parameter item 2 corresponds to a plurality of optional values. For example, the parameter item 1 corresponds to more than two optional values, the parameter item 2 corresponds to more than two optional values, or both the parameter item 1 and the parameter item 2 correspond to more than two optional values. In this way, in the resource configuration information transmitted by the network device, values of the parameter item 1 and the parameter item 2 each are one of respective corresponding optional values. The resource pattern is used to indicate a mapping relationship between the positioning reference signal and a time-frequency resource. After configuring the time-frequency resource for the positioning reference signal, the network device transmits the positioning reference signal by using the corresponding time-frequency resource, implementing positioning measurement of the terminal.

It should be noted that this embodiment of this disclosure does not constitute any limitation on a time sequence of step 41 and step 42. Step 42 may be executed before step 41 or after step 41.

In an embodiment of this disclosure, the parameter item included in the resource configuration information may include: a frequency density of the resource pattern, and the frequency density is used to indicate that the positioning reference signals are spaced N subcarriers apart in frequency domain, where N is one of first optional values corresponding to the frequency density. That is, the resource pattern of the positioning reference signal is related to the frequency density of the positioning reference signal.

The frequency density may be a frequency density of the positioning reference signal on each physical resource block (PRB). The frequency density may be represented by a comb-shaped (such as comb-N) structure, indicating that the positioning reference signal is equally spaced N subcarriers apart in frequency domain. N is one of the first optional values corresponding to the frequency density. The first optional value may include at least one of 1, 2, 3, 4, 6, and 12. It is assumed that the first optional value includes 1, 2, 3, 4, 6, and 12, N may be 1, 2, 3, 4, 6, or 12. The frequency density represented by the comb-N structure may be equivalent to a density of 12/N, indicating a quantity of resource elements (RE) equally spaced apart and included in one resource block (RB). N=1, 2, 3, 4, 6, or 12 is equivalent to a density of 12, 6, 4, 3, 2, or 1, respectively.

In an embodiment of this disclosure, the parameter item in the resource configuration information may further include: a frequency offset between adjacent symbols in the resource pattern, and a second optional value corresponding to the frequency offset is related to the first optional value. That is, the resource pattern of the positioning reference signal is related to the frequency offset between adjacent symbols in the positioning reference signal.

The frequency offset may be a RE offset (shift), used to indicate a per-RE offset (frequency offset) between adjacent symbols of the positioning reference signal. In this way, a RE position of a symbol in the positioning reference signal may be obtained through calculation based on an RE position of a previous adjacent symbol and a configured RE offset.

The second optional value corresponding to the frequency offset is related to the first optional value corresponding to the frequency density, such as a value of the RE offset (the second optional value) is related to the comb-N structure (the first optional value). Optionally, the second optional value may be a factor of the first optional value, and the second optional value is different from the first optional value. To be specific, the second optional value may be a value other than the first optional value in the factor of the first optional value, for example, the value of the RE offset may be a factor of N other than N itself. Alternatively, the second optional value may be the same as the first optional value. For N being 12 (comb-12), the RE offset may be at least one of 1, 2, 3, 4, and 6; for N being 6 (comb-6), the RE offset may be at least one of 1, 2, and 3; for N being 4 (comb-4), the RE offset may be 1 and/or 2; for N being 3 (comb-3), the RE offset may be 1; for N being 2 (comb-2), the RE offset may be 1; for N being 1 (comb-1), the RE offset is not configured.

Optionally, the frequency offset described in this embodiment of this disclosure may be a positive offset, or the frequency offset may be a negative offset. The positive offset is an offset directing to a higher frequency, and the negative offset is an offset directing to a lower frequency.

Further, in a case that a first frequency position obtained through calculation based on the frequency offset exceeds a frequency range of a resource block RB, a frequency position of the positioning reference signal is a position obtained by performing modulo on the first frequency position based on a specific value. The specific value may be a maximum number of frequency domain granularities contained in an RB. Assuming that a frequency domain granularity is RE, the specific value may be a maximum number of REs contained in an RB, that is, 12. In this way, in a case that a RE position of a symbol obtained through calculation based on the RE offset exceeds a range of one RB, the modulus (mod 12) may be obtained to make the frequency position of the positioning reference signal in the symbol fall within the range of the RB.

Optionally, the parameter item in the resource configuration information may include: the number of symbols included in the resource pattern, used to indicate the number of symbols occupied by the positioning reference signal. In a case that the number of symbols occupied by the positioning reference signal is greater than 1, a plurality of symbols occupied by the positioning reference signal may be continuous or discontinuous.

A third optional value corresponding to the number of symbols may be greater than or equal to a quotient of the first optional value and the second optional value, that is, the number of symbols occupied by the positioning reference signal is not less than N/frequency offset. It is assumed that the frequency density is 2, the frequency offset is 1, and the number of symbols is greater than or equal to 2. It is assumed that the frequency density is 3, the frequency offset is 1, and the number of symbols is greater than or equal to 3. Assuming that the frequency density is 4, when the frequency offset is 1, the number of symbols may be greater than or equal to 4; when the frequency offset is 2, the number of symbols may be greater than or equal to 2. Assuming that the frequency density is 6, when the frequency offset is 1, the number of symbols may be greater than or equal to 6; when the frequency offset is 2, the number of symbols may be greater than or equal to 3; when the frequency offset is 3, the number of symbols may be greater than or equal to 2. Assuming that the frequency density is 12, when the frequency offset is 1, the number of symbols may be greater than or equal to 12; when the frequency offset is 2, the number of symbols may be greater than or equal to 6; when the frequency offset is 3, the number of symbols may be greater than or equal to 4; when the frequency offset is 4, the number of symbols may be greater than or equal to 3; when the frequency offset is 6, the number of symbols may be greater than or equal to 2.

Alternatively, the third optional value corresponding to the number of symbols may be less than or equal to a maximum number of symbols in the time domain transmission unit in which the positioning reference signal is located. Using the time domain transmission unit being slot as an example, the number of symbols occupied by the positioning reference signal is not greater than a maximum number of symbols included in the slot. Assuming that the frequency density is 1, the frequency offset can be only 0, and the number of symbols may be 1 to 12 or 1 to 14.

Alternatively, the third optional value corresponding to the number of symbols is related to a cyclic prefix (CP) type of the positioning reference signal. In other words, the resource pattern of the positioning reference signal is related to the CP type, and the CP type of the positioning reference signal may be configured by the network device. For example, for normal CP, the number of symbols occupied by the positioning reference signal does not exceed a maximum number of symbols included in one time domain transmission unit (such as slot) for normal CP, for example, 14. For extended CP, the number of symbols occupied by the positioning reference signal does not exceed a maximum number of symbols included in one time domain transmission unit (such as slot) for extended CP, for example, 12.

Optionally, the parameter item in the resource configuration information may further include: a position of the first symbol in the resource pattern, used to indicate a position of the first symbol of the positioning reference signal in a time domain transmission unit (such as a slot). A fourth optional value corresponding to the first symbol position falls in a range: a subset or full set of [0, M], where M is difference between the number of symbols included in the resource pattern and the maximum number of symbols in the time domain transmission unit in which the positioning reference signal is located. Using the fourth optional value with a range of [0, M] as an example, the position of the first symbol in the resource pattern may be a position with a symbol sequence number being 0, 1, . . . , M−1, or M.

Optionally, the parameter item in the resource configuration information may further includes a lowest frequency position for the first symbol of the resource pattern, and a fifth optional value corresponding to the lowest frequency position falls in a range: a subset or full set of [0, N−1]. In other words, the lowest position of the positioning reference signal in frequency domain in the first symbol is related to the comb-N structure. Using the range of the fifth optional value being [0, N−1] as an example, the lowest frequency position in the first symbol of the resource pattern may be a position with a RE number of 0, 1, . . . , N−2, or N−1. For example, the frequency density is 6, and the lowest frequency position is one of 0 to 5.

It should be noted that the resource configuration information may include at least one of the frequency density of the positioning reference signal, the frequency offset (such as RE offset) between the adjacent symbols of the positioning reference signal, the number of symbols occupied by the positioning reference signal, the position of the first symbol occupied by the positioning reference signal, the lowest frequency position in the first symbol occupied by the positioning reference signal, and the like. In the parameter items included in the resource configuration information, there is at least one parameter item corresponding to a plurality of optional values, and different resource patterns are determined based on different values of the parameter item. The following embodiments of this disclosure further describe the resource pattern of the positioning reference signal configured by the network device with reference to specific examples.

Example 1: Frequency Density Indicates Comb-12, Using Normal CP as an Example

Figure 5A:
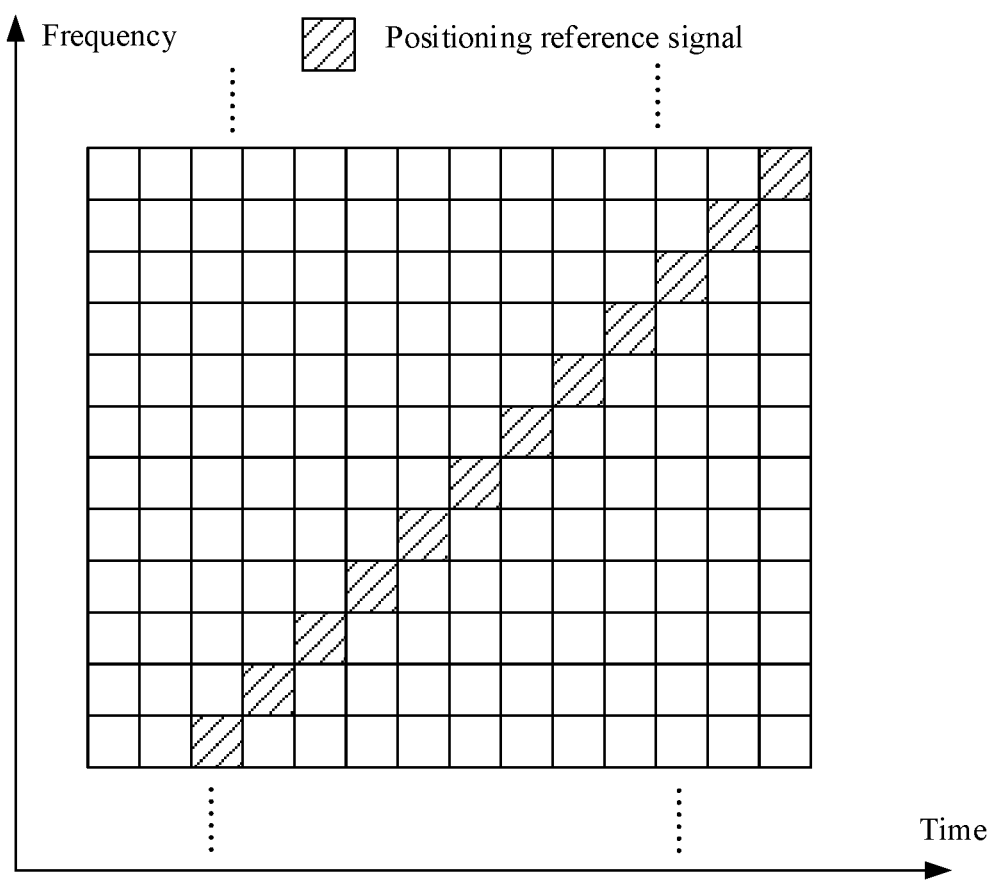
FIGS. 5a and 5b are schematic diagrams of resource patterns of positioning reference signals in Example 1 according to an embodiment of this disclosure.

As shown in FIG. 5a, in the resource configuration information configured by the network device, the frequency density indicates comb-12, the frequency offset is 1, the quantity of included symbols is 12, the position of the first symbol is 2, and the lowest frequency position in the first symbol is 0.

Figure 5B:
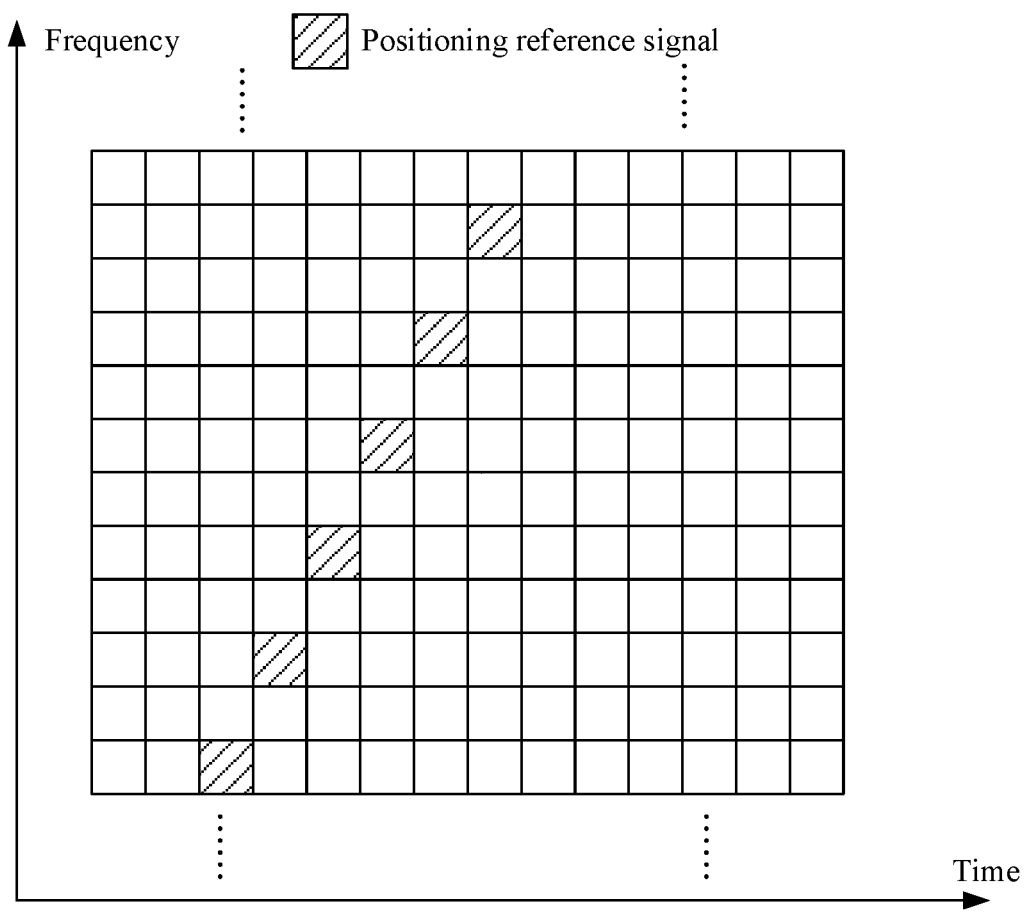

As shown in FIG. 5b, in the resource configuration information configured by the network device, the frequency density indicates comb-12, the frequency offset is 2, the quantity of included symbols is 6, the position of the first symbol is 2, and the lowest frequency position in the first symbol is 0.

Example 2: Frequency Density Indicates Comb-6, Using Normal CP as an Example

Figure 6A:
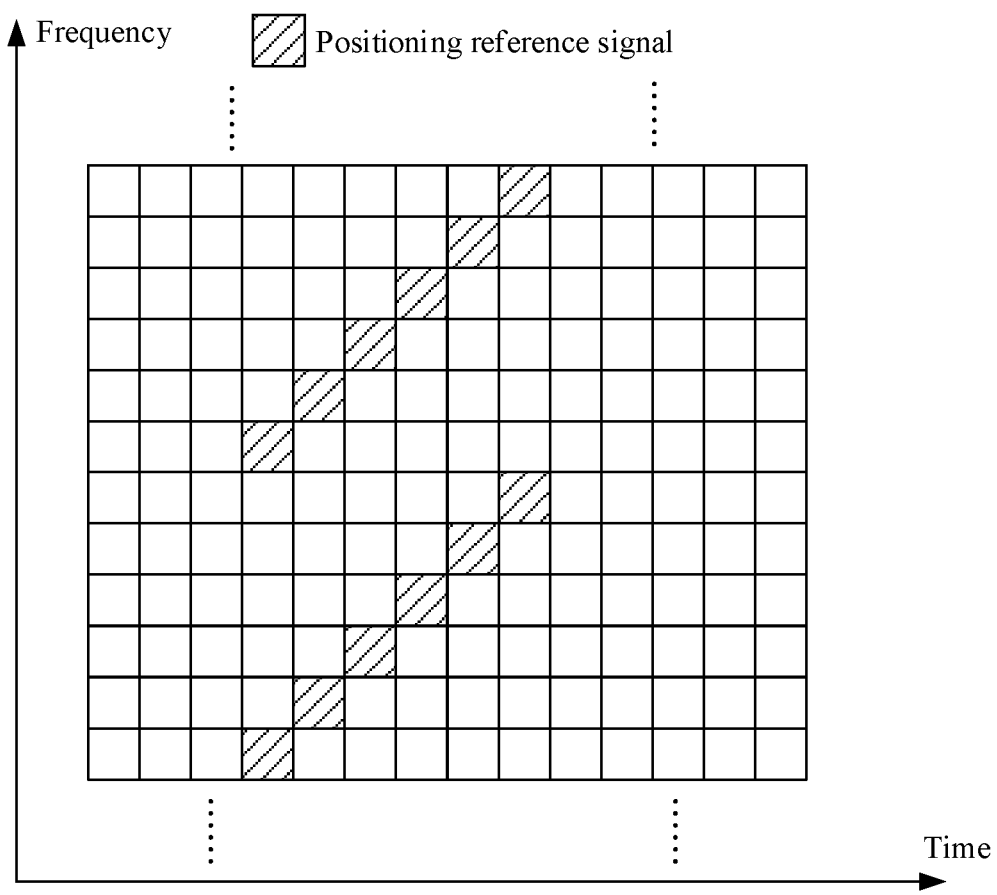
FIGS. 6a to 6f are schematic diagrams of resource patterns of positioning reference signals in Example 2 according to an embodiment of this disclosure.

As shown in FIG. 6a, in the resource configuration information configured by the network device, the frequency density indicates comb-6, the frequency offset is 1, the quantity of included symbols is 6, the position of the first symbol is 3, and the lowest frequency position in the first symbol is 0.

Figure 6B:
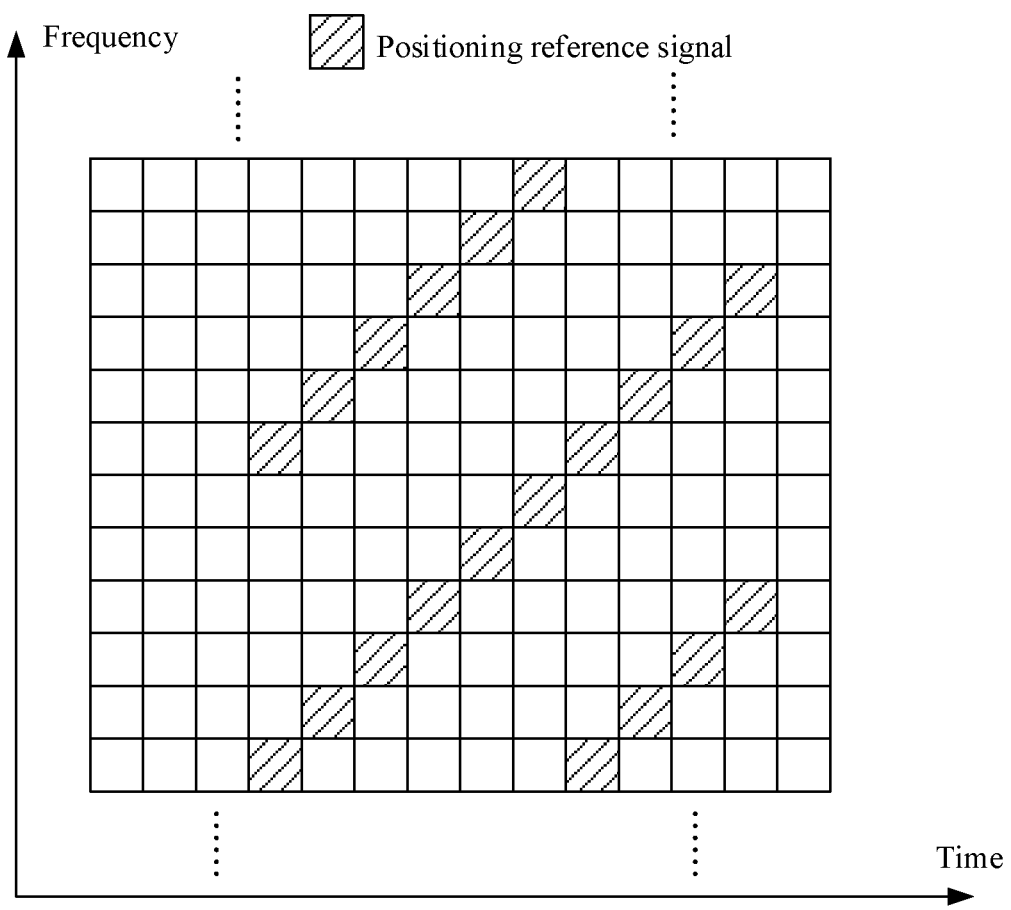

As shown in FIG. 6b, in the resource configuration information configured by the network device, the frequency density indicates comb-6, the frequency offset is 1, the quantity of included symbols is 10, the position of the first symbol is 3, and the lowest frequency position in the first symbol is 0.

Figure 6C:
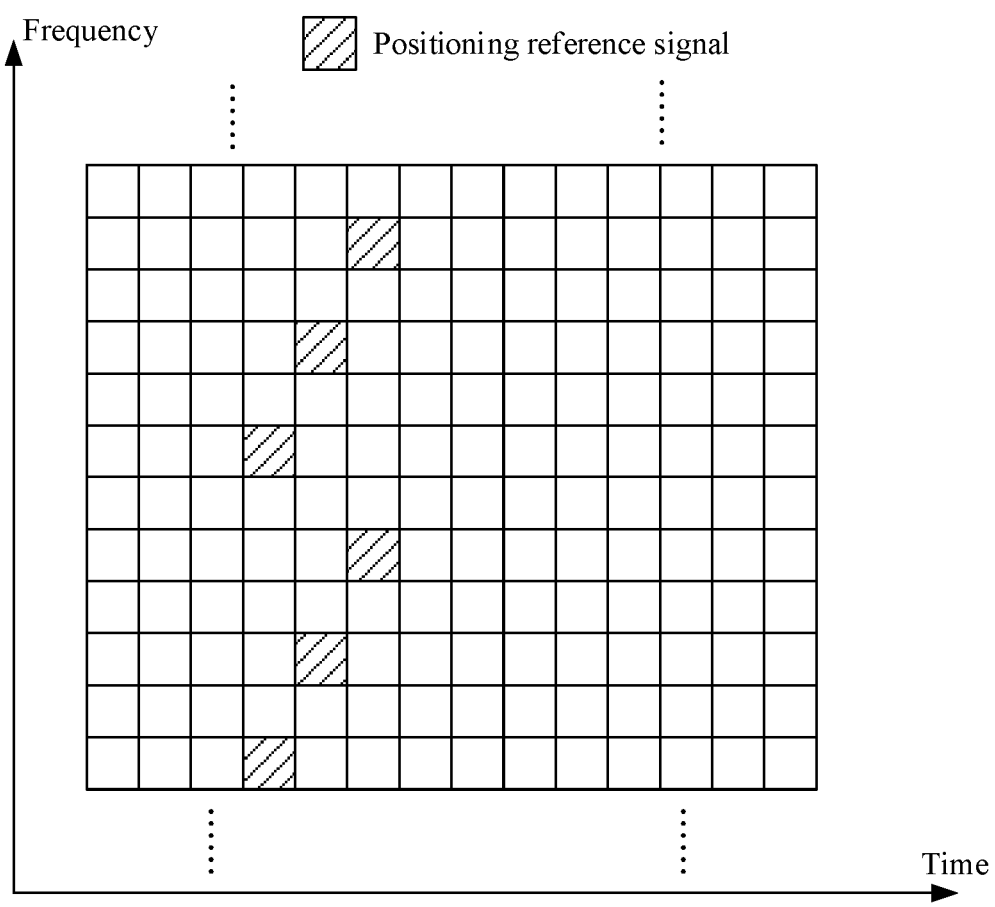

As shown in FIG. 6c, in the resource configuration information configured by the network device, the frequency density indicates comb-6, the frequency offset is 2, the quantity of included symbols is 3, the position of the first symbol is 3, and the lowest frequency position in the first symbol is 0.

Figure 6D:
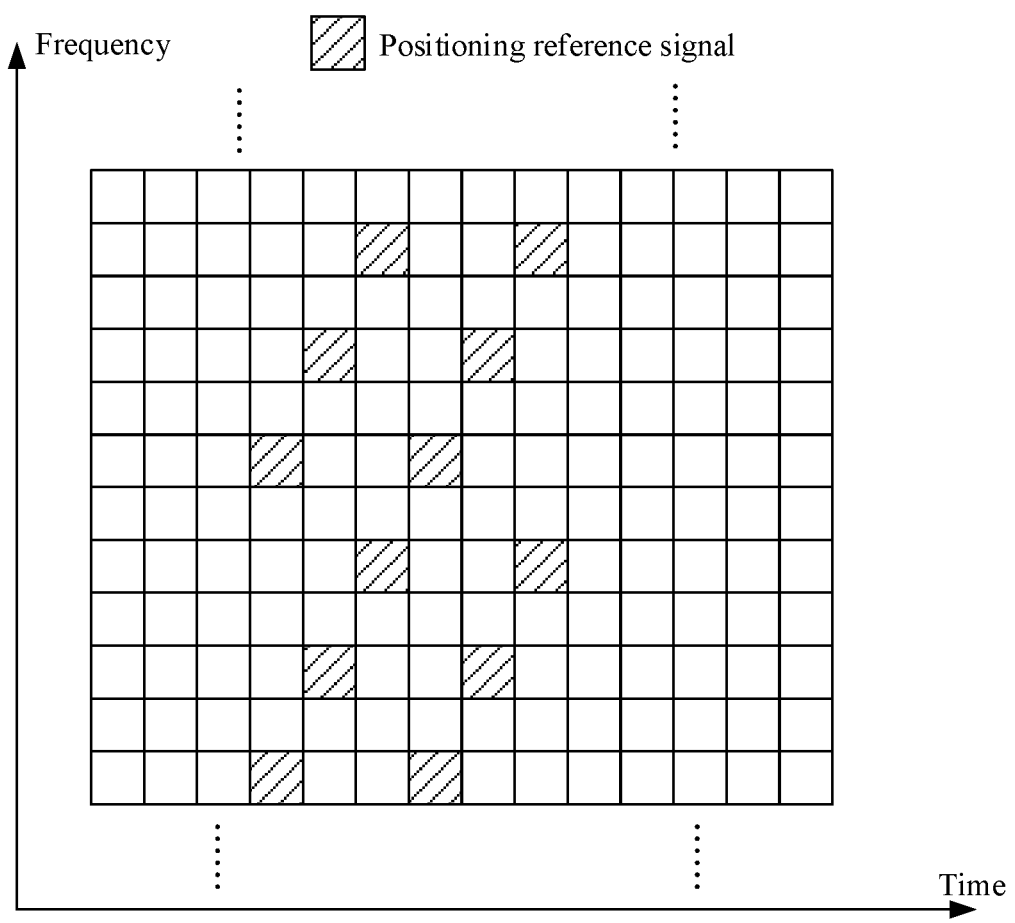

As shown in FIG. 6d, in the resource configuration information configured by the network device, the frequency density indicates comb-6, the frequency offset is 2, the quantity of included symbols is 6, the position of the first symbol is 3, and the lowest frequency position in the first symbol is 0.

Figure 6E:
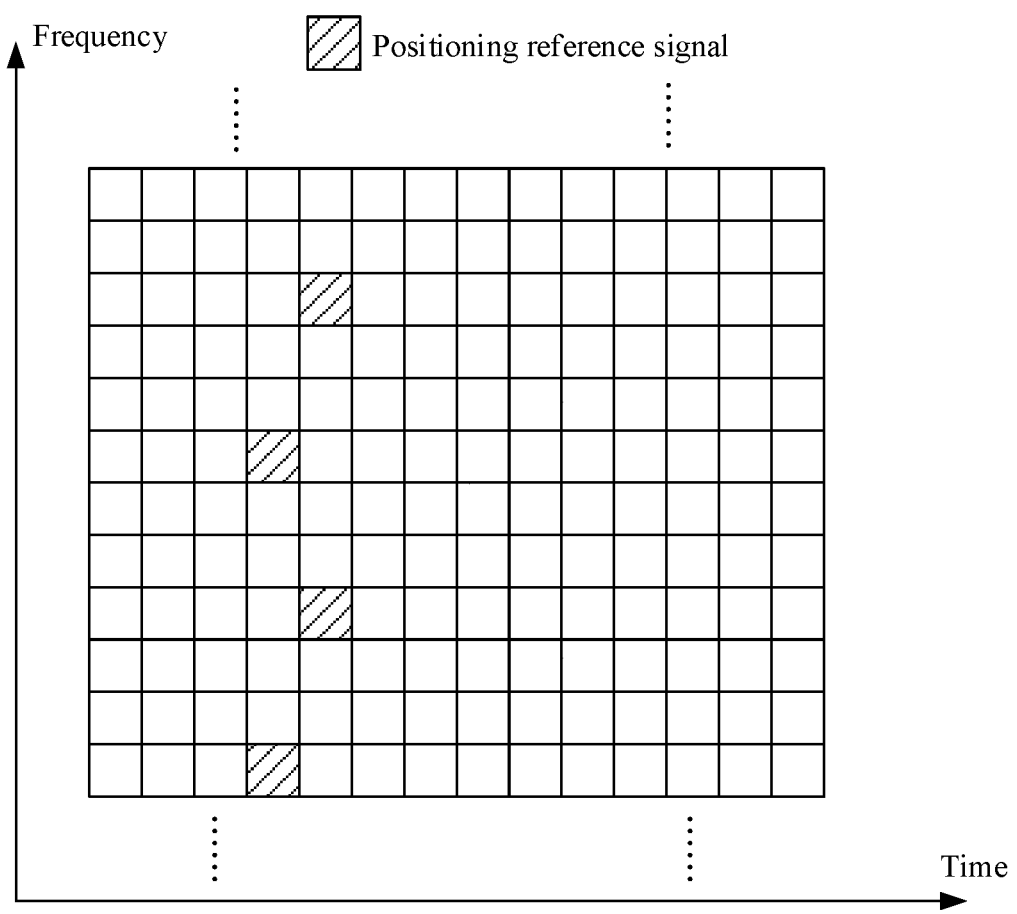

As shown in FIG. 6e, in the resource configuration information configured by the network device, the frequency density indicates comb-6, the frequency offset is 3, the quantity of included symbols is 2, the position of the first symbol is 3, and the lowest frequency position in the first symbol is 0.

Figure 6F:
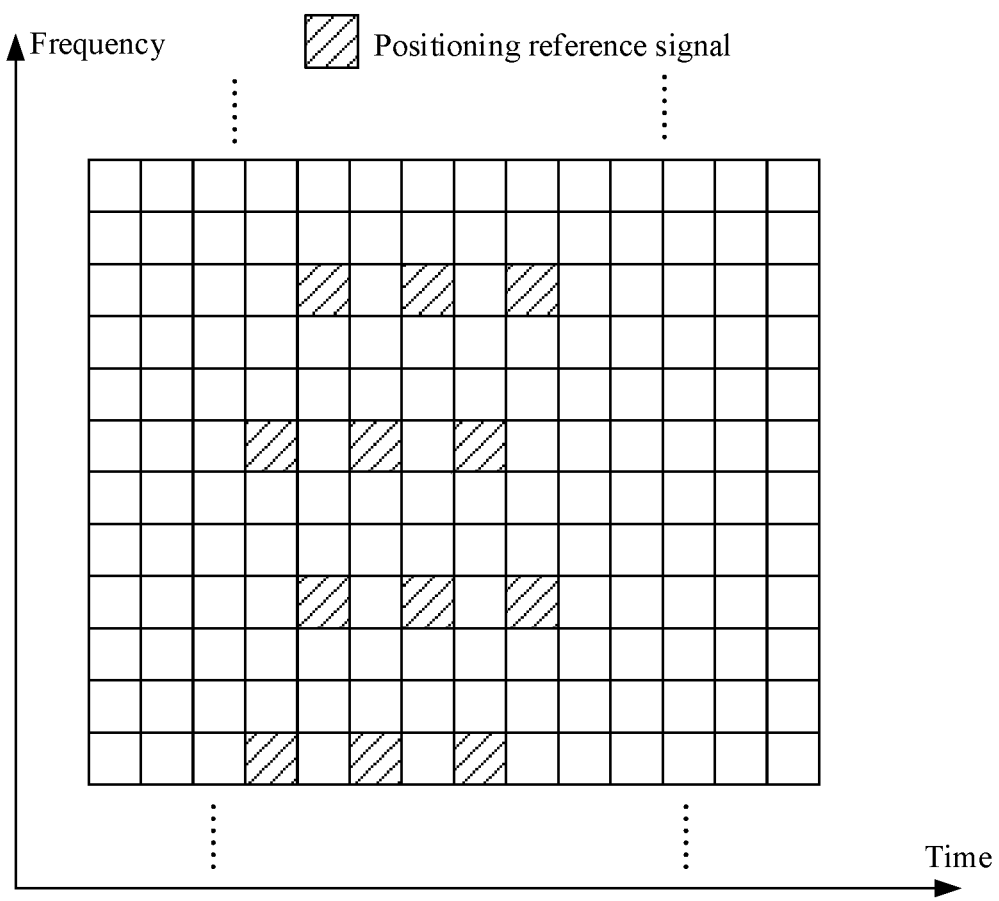

As shown in FIG. 6f, in the resource configuration information configured by the network device, the frequency density indicates comb-6, the frequency offset is 3, the quantity of included symbols is 6, the position of the first symbol is 3, and the lowest frequency position in the first symbol is 0.

Example 3: Frequency Density Indicates Comb-4, Using Normal CP as an Example

Figure 7A:
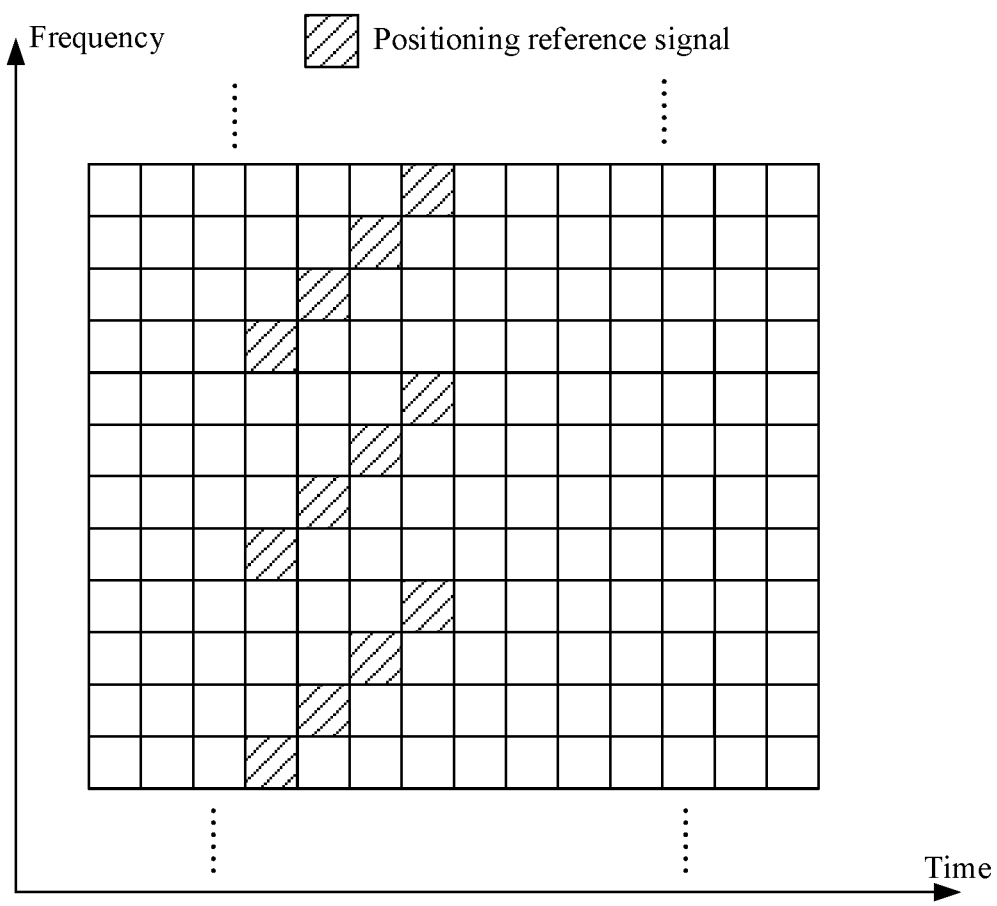
FIGS. 7a to 7d are schematic diagrams of resource patterns of positioning reference signals in Example 3 according to an embodiment of this disclosure.

As shown in FIG. 7a, in the resource configuration information configured by the network device, the frequency density indicates comb-4, the frequency offset is 1, the quantity of included symbols is 4, the position of the first symbol is 3, and the lowest frequency position in the first symbol is 0.

Figure 7B:
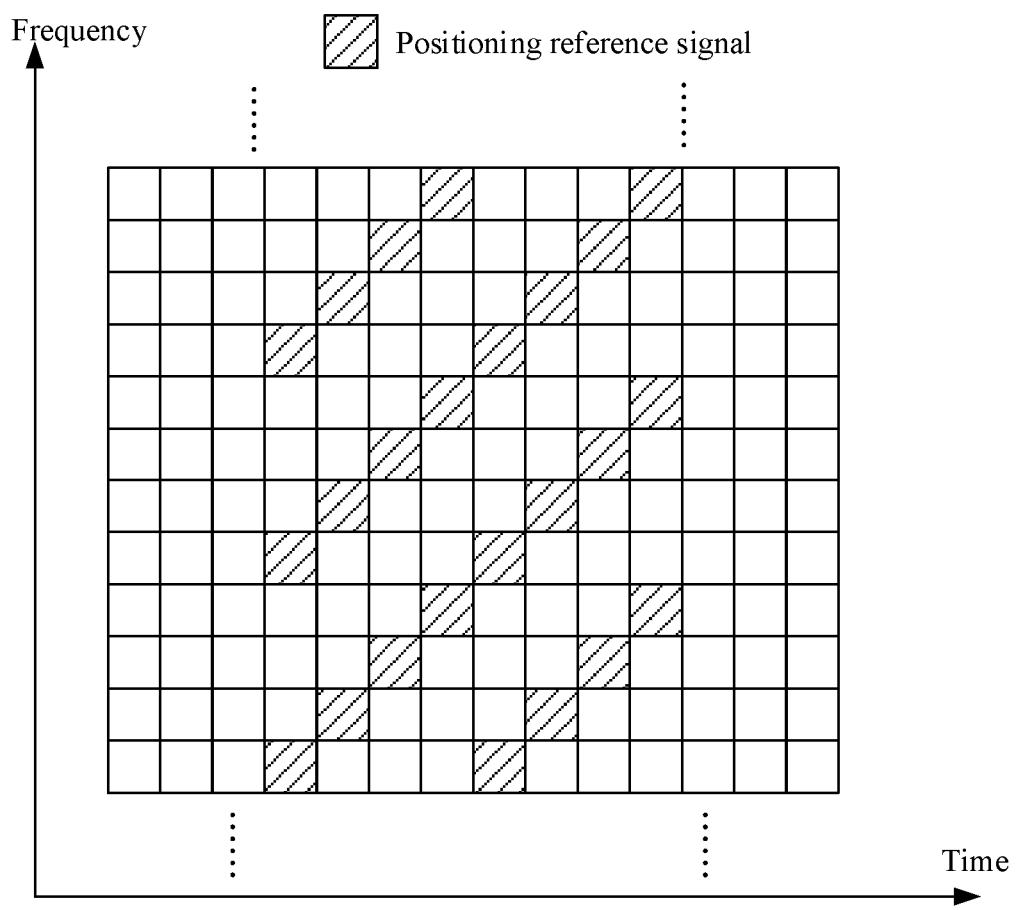

As shown in FIG. 7b, in the resource configuration information configured by the network device, the frequency density indicates comb-4, the frequency offset is 1, the quantity of included symbols is 8, the position of the first symbol is 3, and the lowest frequency position in the first symbol is 0.

Figure 7C:
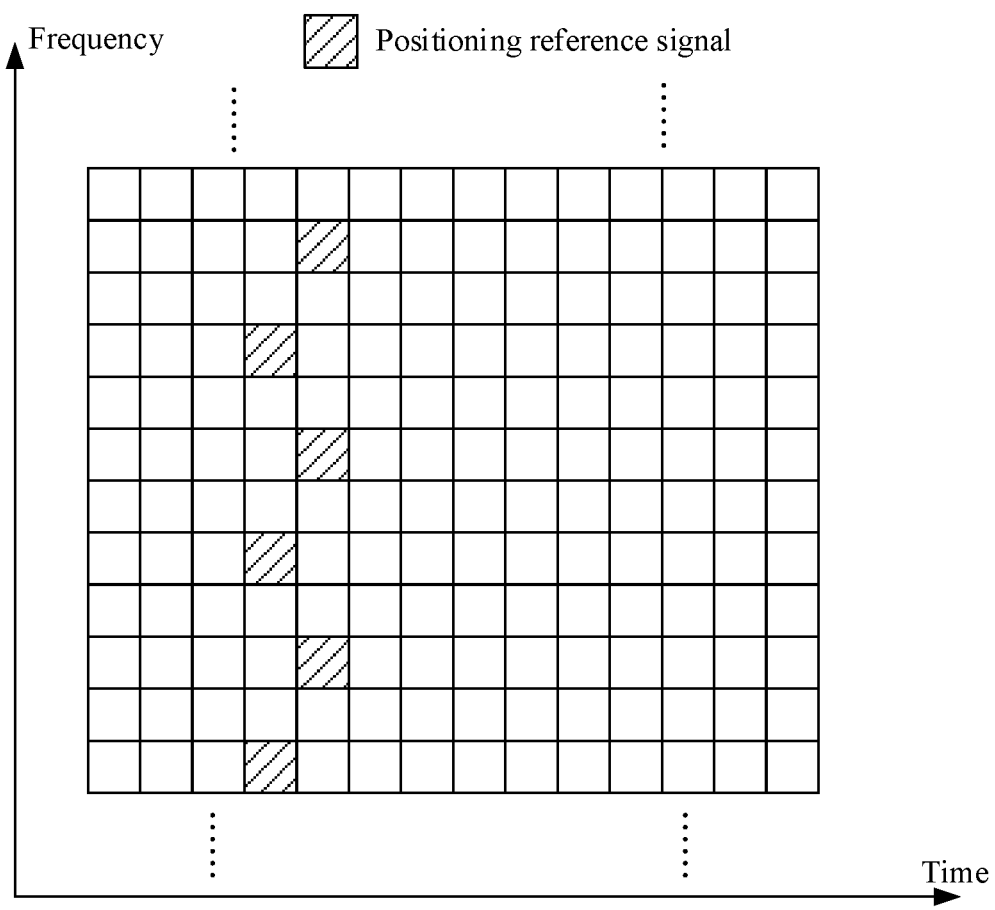

As shown in FIG. 7c, in the resource configuration information configured by the network device, the frequency density indicates comb-4, the frequency offset is 2, the quantity of included symbols is 2, the position of the first symbol is 3, and the lowest frequency position in the first symbol is 0.

Figure 7D:
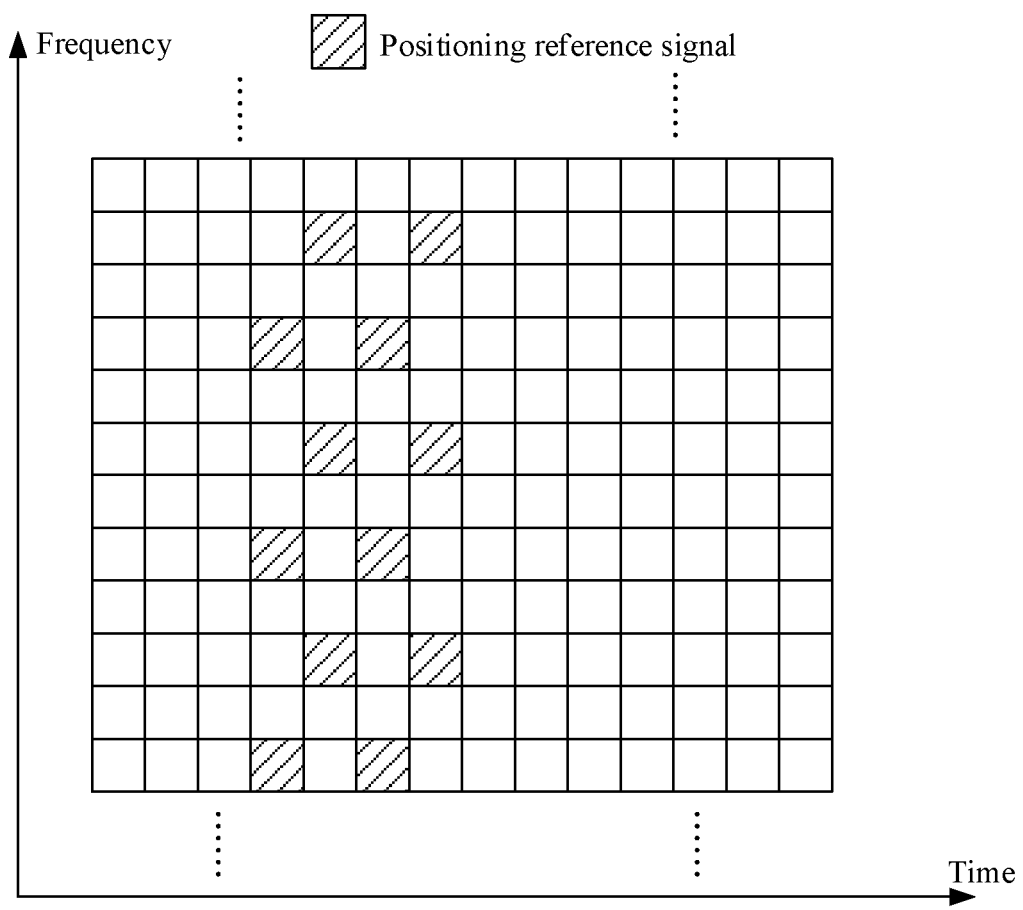

As shown in FIG. 7d, in the resource configuration information configured by the network device, the frequency density indicates comb-4, the frequency offset is 2, the quantity of included symbols is 4, the position of the first symbol is 3, and the lowest frequency position in the first symbol is 0.

Example 4: Frequency Density Indicates Comb-3, Using Normal CP as an Example

Figure 8A:
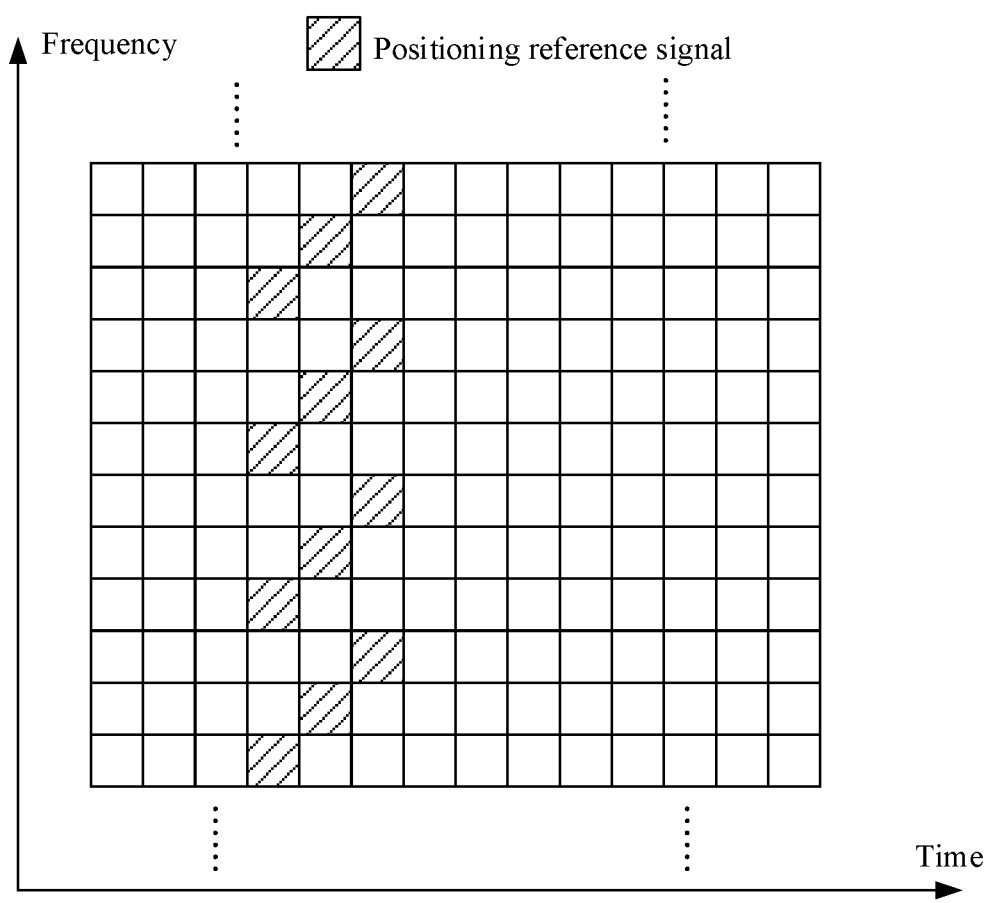
FIGS. 8a and 8b are schematic diagrams of resource patterns of positioning reference signals in Example 4 according to an embodiment of this disclosure.

As shown in FIG. 8a, in the resource configuration information configured by the network device, the frequency density indicates comb-3, the frequency offset is 1, the quantity of included symbols is 3, the position of the first symbol is 3, and the lowest frequency position in the first symbol is 0.

Figure 8B:
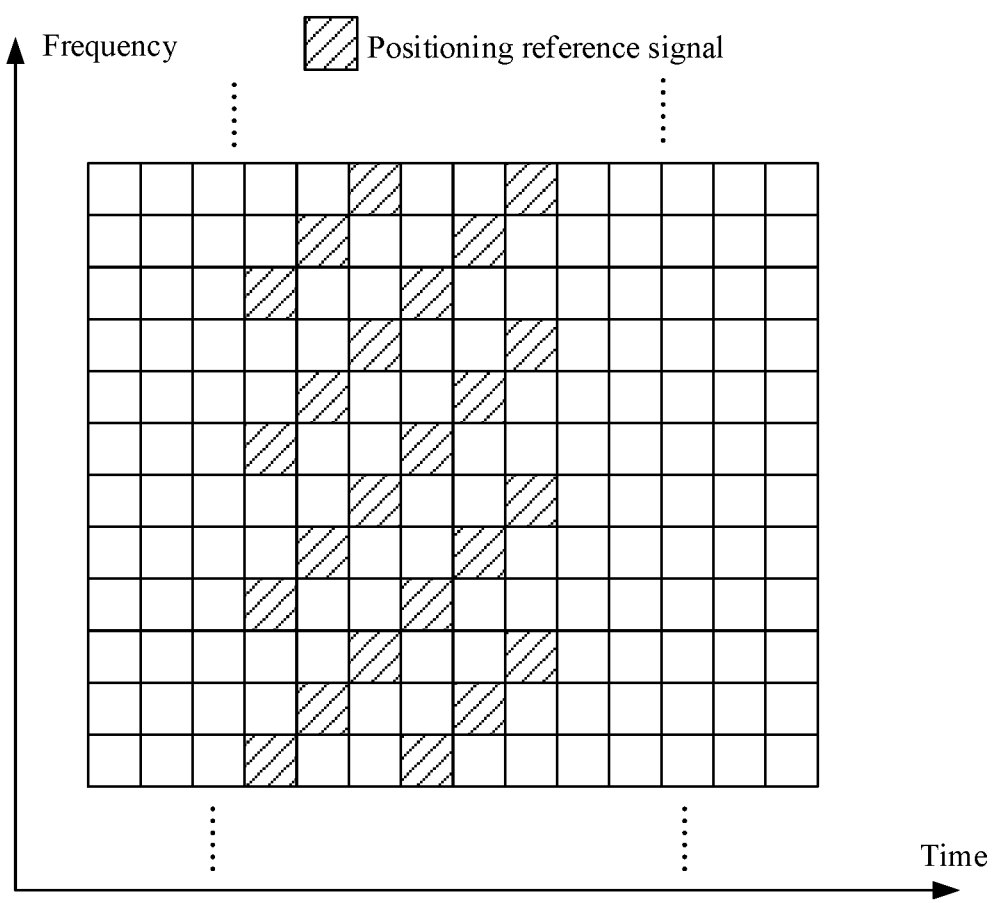

As shown in FIG. 8b, in the resource configuration information configured by the network device, the frequency density indicates comb-3, the frequency offset is 1, the quantity of included symbols is 6, the position of the first symbol is 3, and the lowest frequency position in the first symbol is 0.

Example 5: Frequency Density Indicates Comb-2, Using Normal CP as an Example

Figure 9A:
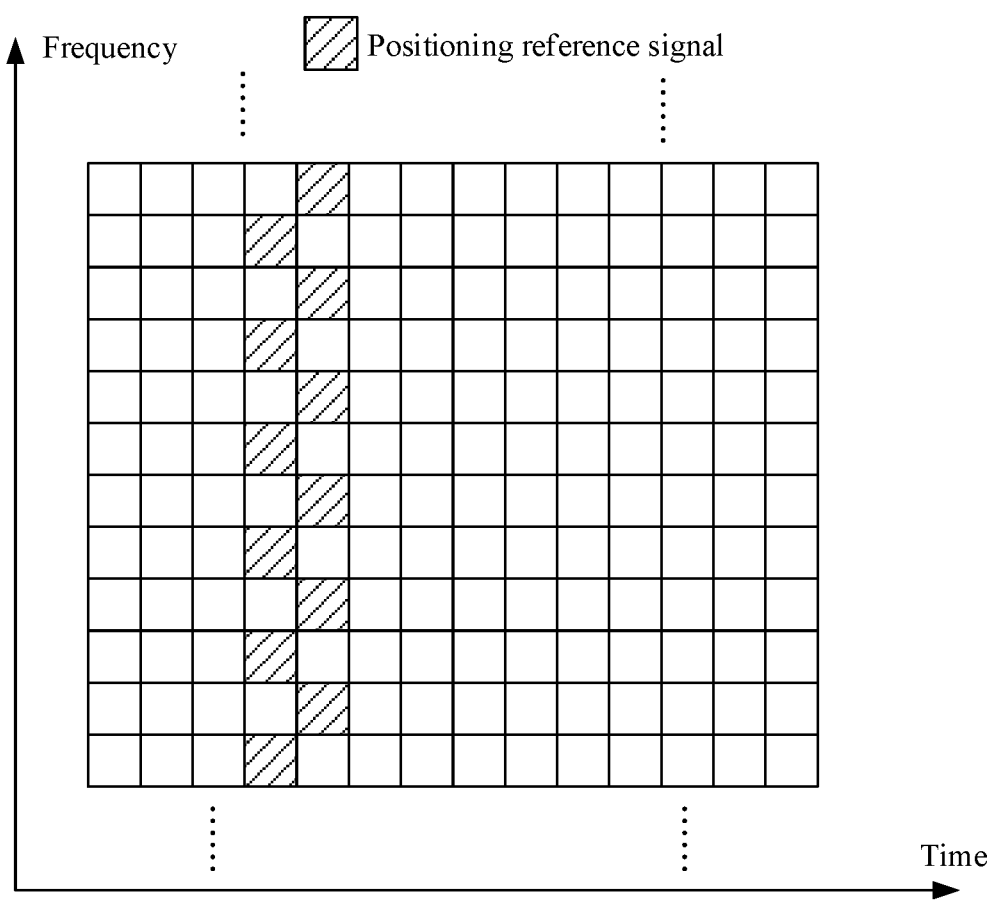
FIGS. 9a and 9b are schematic diagrams of resource patterns of positioning reference signals in Example 5 according to an embodiment of this disclosure.

As shown in FIG. 9a, in the resource configuration information configured by the network device, the frequency density indicates comb-2, the frequency offset is 1, the quantity of included symbols is 2, the position of the first symbol is 3, and the lowest frequency position in the first symbol is 0.

Figure 9B:
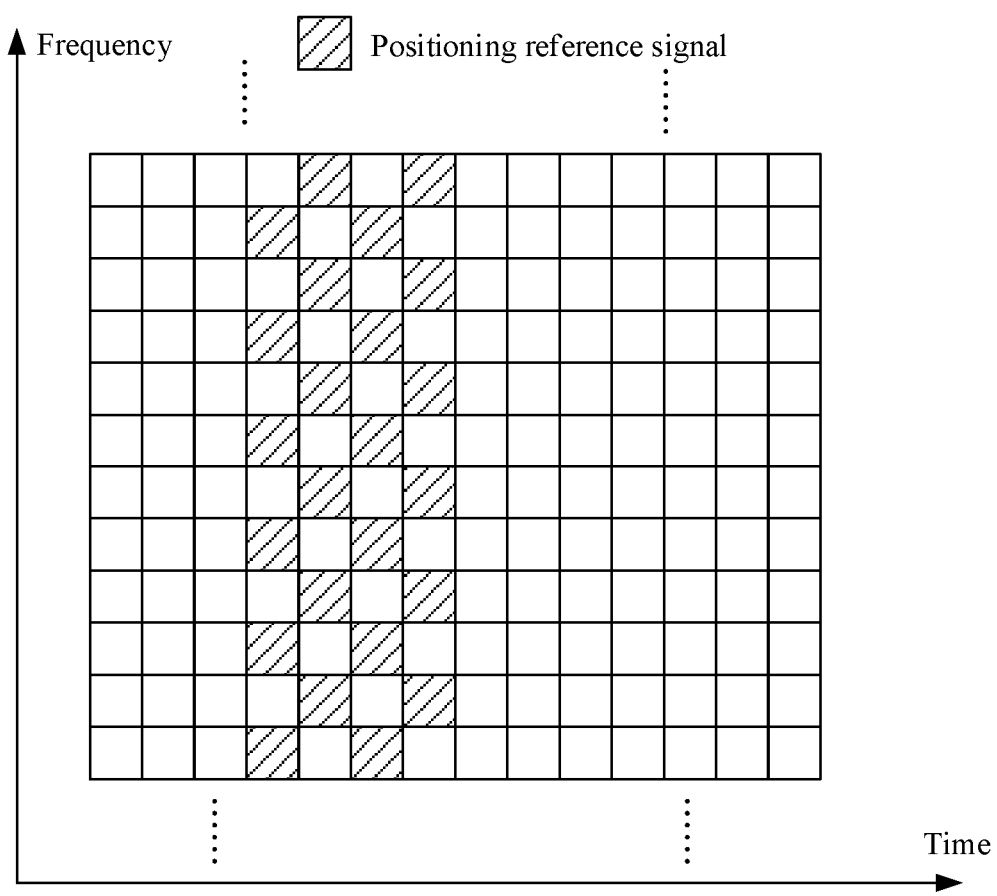

As shown in FIG. 9b, in the resource configuration information configured by the network device, the frequency density indicates comb-2, the frequency offset is 1, the quantity of included symbols is 4, the position of the first symbol is 3, and the lowest frequency position in the first symbol is 0.

Example 6: Frequency Density Indicates Comb-1, Using Normal CP as an Example

Figure 10:
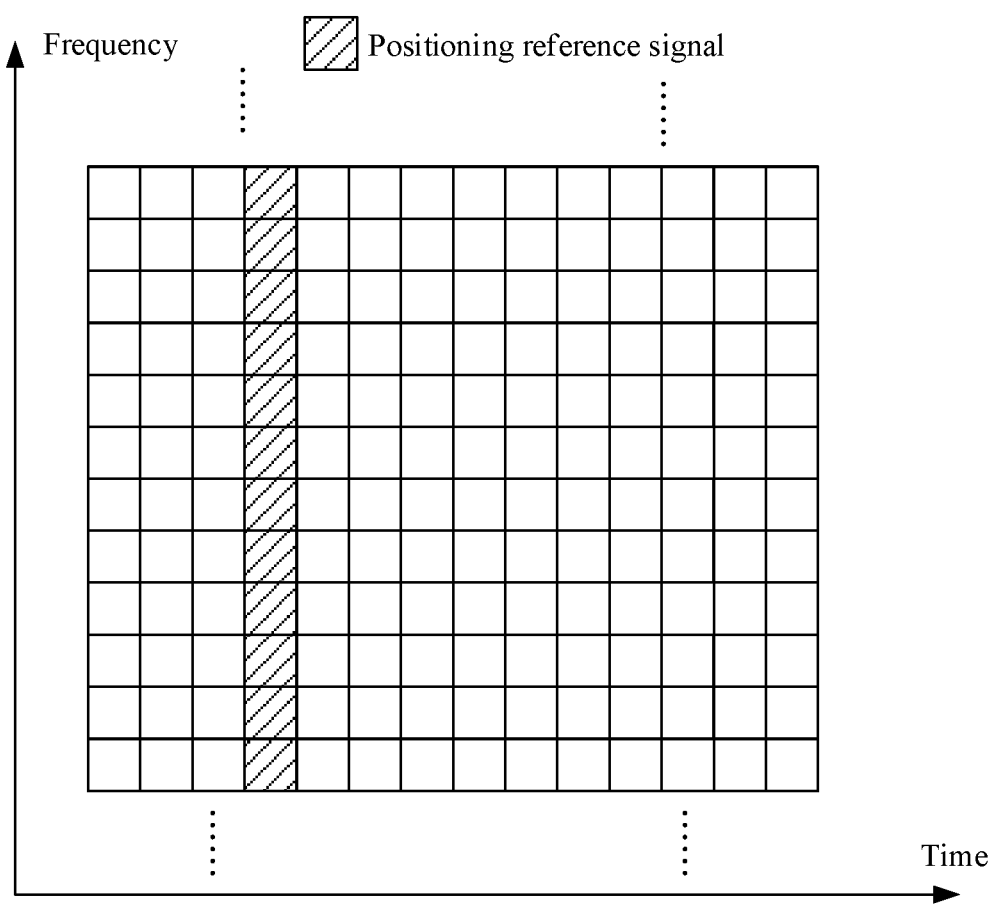
FIG. 10 is a schematic diagram of a resource pattern of a positioning reference signal in Example 6 according to an embodiment of this disclosure.

As shown in FIG. 10, in the resource configuration information configured by the network device, the frequency density indicates comb-1, the frequency offset is 0 (without offset in frequency domain), the quantity of included symbols is 1, the position of the first symbol is 3, and the lowest frequency position in the first symbol is 0.

It should be noted that the foregoing examples merely shows some resource patterns determined based on different optional values of different parameter items in the resource configuration information. Those skilled in the art can understand that the resource patterns determined by the foregoing configuration manners of the resource configuration information all belong to the embodiments of this disclosure. Examples are not described one by one herein.

The positioning reference signal in this embodiment of this disclosure may occupy one symbol, or may occupy a plurality of symbols. When the positioning reference signal occupies a plurality of symbols, the occupied plurality of symbols may be continuous or discontinuous. That is, when the resource pattern includes more than two symbols, these symbols may be continuous or discontinuous.

In a case that the resource pattern includes at least two discontinuous symbols, the resource pattern occupies at least one resource element RE on every P subcarriers, where P is 1, 2, or 3. That is, in a resource pattern with discontinuous symbols, there is at least one RE on each subcarrier of a PRB in which the resource pattern is located. Alternatively, in a resource pattern with discontinuous symbols, there is at least one RE on every two or three subcarriers of a PRB in which the resource pattern is located.

Optionally, in a case that the resource pattern includes at least two discontinuous symbols, the symbols included in the resource pattern are equally spaced apart, that is, the symbols occupied by the positioning reference signal may be equally spaced apart in time domain.

Optionally, in a case that the resource pattern includes at least two discontinuous symbols, a resource pattern for the at least two discontinuous symbols is obtained by truncating a resource pattern in continuous symbols. That is, the resource pattern with discontinuous symbols may be obtained by truncating the resource pattern with continuous symbols in time domain.

Figures 11, 12:
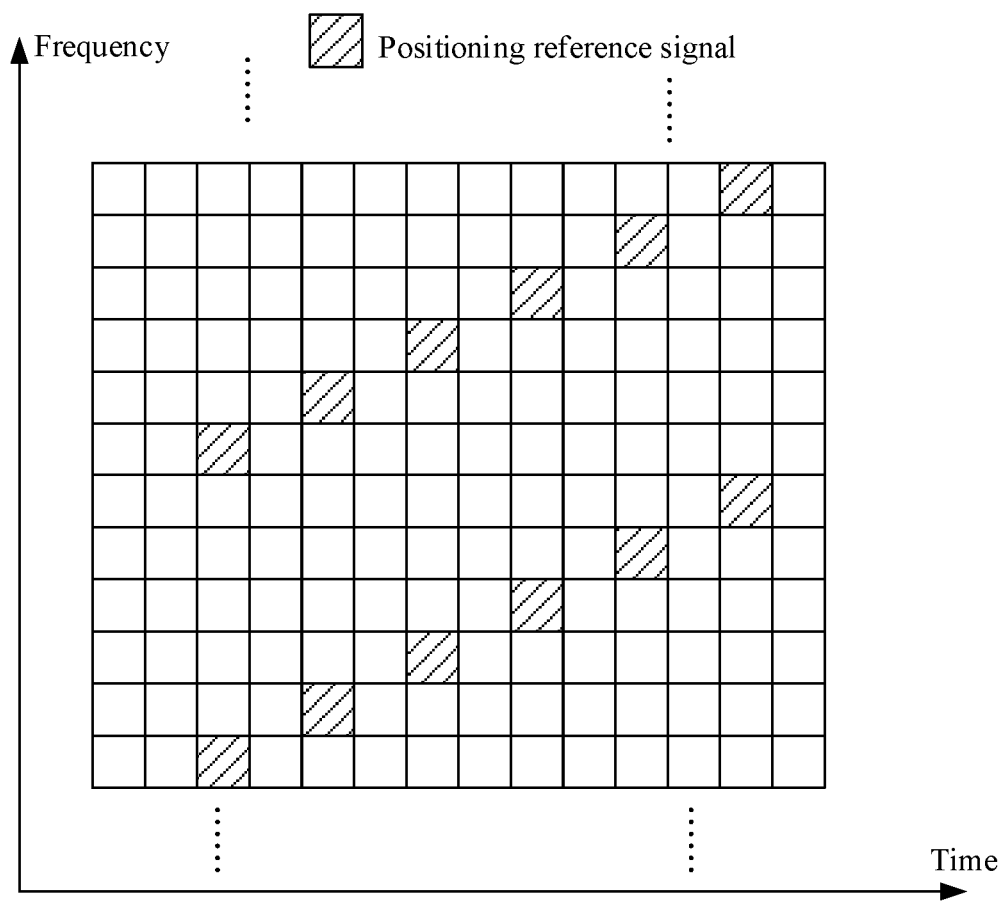
FIG. 11 is a schematic diagram of a resource pattern including at least two discontinuous symbols according to an embodiment of this disclosure.
FIG. 12 is a schematic diagram of a modular structure of a network device according to an embodiment of this disclosure.

The resource pattern with discontinuous symbols is more suitable for scenarios with great impact of Doppler spread. As shown in FIG. 11, the position of the first symbol occupied by the positioning reference signal is 3, a time domain interval is 2 symbols, an actual quantity of included symbols is 6, the frequency density is comb-6, and the frequency offset is 1, and the lowest frequency position of the first symbol is 0.

The resource configuration information in this embodiment of this disclosure may include not only the parameter items for determining the resource pattern described above, but also include indication information indicating different ports. The resource pattern may correspond to one port, or correspond to at least two ports.

In a case that the resource patterns correspond to at least two ports, resource patterns on different ports may be the same, or the resource patterns on different ports may be time-division multiplexed, or the resource patterns on different ports are frequency-division multiplexed. That is, the resource pattern of the positioning reference signal is related to port information of the positioning reference signal. If the positioning reference signal is configured with more than one port, the resource patterns of different ports may be the same or frequency-division multiplexed or time-division multiplexed.

Further, in a case that the resource patterns on different ports are the same, generation sequences for positioning reference signals on different ports are different, or the positioning reference signal has different frequency domain orthogonal covering code (FD-OCC) on different ports.

Using the positioning reference signals on different ports having different generation sequences as an example, an initial value of a generation sequence is related to a port number of a port. Assuming that the resource patterns of the two ports are the same, the positioning reference signals on the two ports have different generation sequences. For example, an initial value (such as a generation parameter) of a generation sequence of a positioning reference signal on a port t is related to a number of the port t. The generation sequence of the positioning reference signal may be a Gold sequence, and a generation parameter of the Gold sequence may be obtained through calculation based on a port number. In addition to the port number, the generation parameter of the generation sequence of the positioning reference signal are further related to a PRS resource ID, a CP type, a cell/transmission and reception point (TRP) identifier, or a virtual cell identity of the positioning reference signal.

Using the frequency domain orthogonal covering code being different for the positioning reference signals on different ports as an example, it is assumed that the resource patterns of the two ports are the same, then the positioning reference signals of the two ports are distinguished by FD-OCC. Specifically, a sequence of a positioning reference signal on a port 1 is c(m), and may be directly mapped to REs corresponding to a symbol. A PRS sequence on a port 2 may be c(m)*occ(m) and then mapped to the same RE positions as that on the port 1. occ(m) is an FD-OCC sequence, and may be expressed as (1, −1, 1, −1 . . . , 1, −1, 1, −1).

Further, the resource patterns on different ports may be frequency-division multiplexed. Assuming that the positioning reference signal is configured with two ports, the network device may first configure a resource pattern of one port, and a resource pattern of the other port may be obtained by configuring a frequency offset. Specifically, the frequency offset may be a per-RE offset.

Further, the resource patterns on different ports may be time-division multiplexed. Assuming that the positioning reference signal is configured with two ports, the network device may first configure a resource pattern of one port, and a resource pattern of the other port may be obtained by configuring a time offset. Specifically, the time offset may be a per-symbol offset.

Further, this embodiment of this disclosure describes a relationship between resource patterns on different ports and resource configuration information related to the resource patterns. It should be noted that the resource pattern determined based on the resource configuration information may be determined based on values of parameter items in one set of resource configuration information, or may be determined based on values of parameter items in a plurality sets of resource configuration information. Using a plurality of sets as an example, the resource pattern includes at least two resource subpatterns, and the at least two resource subpatterns are related to the value of the parameter item. In other words, one resource subpattern can be determined based on the values of the parameter items in one set of resource configuration information. For example, the network device configures a periodic resource pattern (a first resource subpattern) of the positioning reference signal for the terminal, for downlink positioning. However, in some specific situations and specific moments, the previously configured periodic resource pattern is incapable of supporting higher-precision positioning. The network device triggers another aperiodic positioning reference signal by using specific signaling, and the network device configures a new resource pattern (a second resource subpattern) for the aperiodic positioning reference signal. The terminal may use both the configured first resource subpattern and the configured second resource subpattern for positioning measurement. Specifically, the terminal may use the periodic first resource subpattern and the aperiodic second resource subpattern to form one resource pattern for positioning measurement.

In this embodiment of this disclosure, frequency offsets of resource patterns in different cells are different. Specifically, the resource patterns of the positioning reference signal in different cells may be distinguished by frequency offset, where the frequency offset is a per-RE offset, and a value of frequency offset is related to a cell ID.

In this embodiment of this disclosure, resource patterns in different cells are time-division multiplexed. Specifically, the resource patterns of the positioning reference signal in different cells may be time-division multiplexed. For example, the resource patterns of the positioning reference signal in different cells may occupy different symbols or slots.

The cell described in this embodiment of this disclosure may be a physical cell or a virtual cell. The cell ID may be at least one of a physical cell ID, a reception point ID, a transmission point (Transfer Point, TP) ID, a global cell ID, and the like.

In the method for configuring a positioning reference signal in this embodiment of this disclosure, the network device configures the resource configuration information of the positioning reference signal for the terminal, and the value of the parameter item in the resource configuration information is one of the at least two optional values that is selected by the network device, so that the system can support configurable positioning reference signal resource allocation, supporting more flexible resource configuration and improving resource utilization.

The method for configuring a positioning reference signal in different scenarios is separately described in detail in the foregoing embodiments. A network device corresponding to the method for configuring a positioning reference signal is further described in the following embodiments with reference to an accompanying drawing.

As shown in FIG. 12, a network device 1200 in an embodiment of this disclosure is capable of implementing details of the foregoing method embodiment, with the same effects achieved: transmitting resource configuration information of a positioning reference signal; and transmitting the positioning reference signal based on a resource pattern indicated by the resource configuration information, where the resource configuration information includes at least one parameter item, a value of the parameter item is one of at least two optional values corresponding to the parameter item, and the resource pattern is related to the value of the parameter item. The network device 1200 specifically includes the following functional modules:

a first transmitting module 1210, configured to transmit resource configuration information of a positioning reference signal; and a second transmitting module 1220, configured to transmit the positioning reference signal based on a resource pattern indicated by the resource configuration information, where the resource configuration information includes at least one parameter item, a value of the parameter item is one of at least two optional values corresponding to the parameter item, and the resource pattern is related to the value of the parameter item.

Optionally, the parameter item includes: a frequency density of the resource pattern, and the frequency density is used to indicate that the positioning reference signals are spaced N subcarriers apart in frequency domain, where N is one of first optional values corresponding to the frequency density.

Optionally, the first optional value includes: at least one of 1, 2, 3, 4, 6, and 12.

Optionally, the parameter item further includes: a frequency offset between adjacent symbols in the resource pattern, and a second optional value corresponding to the frequency offset is related to the first optional value.

Optionally, the second optional value is a factor of the first optional value, and the second optional value is different from the first optional value.

Optionally, the frequency offset is a positive offset, or the frequency offset is a negative offset.

Optionally, in a case that a first frequency position obtained through calculation based on the frequency offset exceeds a frequency range of a resource block RB, a frequency position of the positioning reference signal is a position obtained by performing modulo on the first frequency position based on a specific value.

Optionally, the parameter item further includes the number of symbols included in the resource pattern, and a third optional value corresponding to the number of symbols is greater than or equal to a quotient of the first optional value and the second optional value.

Optionally, the parameter item includes the number of symbols included in the resource pattern, and a third optional value corresponding to the number of symbols is less than or equal to a maximum number of symbols in a time domain transmission unit in which the positioning reference signal is located.

Optionally, the parameter item includes the number of symbols included in the resource pattern, and a third optional value corresponding to the number of symbols is related to a cyclic prefix CP type of the positioning reference signal.

Optionally, the parameter item further includes a position of the first symbol of the resource pattern, and a range of a fourth optional value corresponding to the position of the first symbol is [0, M], where M is a difference between the number of symbols included in the resource pattern and the maximum number of symbols in the time domain transmission unit in which the positioning reference signal is located.

Optionally, the parameter item further includes a lowest frequency position for the first symbol of the resource pattern, and a fifth optional value corresponding to the lowest frequency position falls in a range of [0, N−1].

Optionally, in a case that the resource patterns correspond to at least two ports, resource patterns on different ports are the same, or the resource patterns on different ports are time-division multiplexed, or the resource patterns on different ports are frequency-division multiplexed.

Optionally, in a case that the resource patterns on different ports are the same, generation sequences for positioning reference signals on different ports are different, or frequency domain orthogonal covering codes for the positioning reference signals on different ports are different.

Optionally, an initial value of the generation sequence is related to a port number of the port.

Optionally, in a case that the resource pattern includes at least two discontinuous symbols, the resource pattern occupies at least one resource element RE on every P subcarriers, where P is 1, 2, or 3.

Optionally, in a case that the resource pattern includes at least two discontinuous symbols, symbols contained in the resource pattern are equally spaced apart.

Optionally, in a case that the resource pattern includes at least two discontinuous symbols, a resource pattern for the at least two discontinuous symbols is obtained by truncating a resource pattern in continuous symbols.

Optionally, the resource pattern includes at least two resource subpatterns, and the at least two resource subpatterns are related to the value of the parameter item.

Optionally, frequency offsets of resource patterns in different cells are different.

Optionally, resource patterns in different cells are time-division multiplexed.

It should be noted that the network device in this embodiment of this disclosure configures the resource configuration information of the positioning reference signal for the terminal, and the value of the parameter item in the resource configuration information is one of the at least two optional values that is selected by the network device, so that the system can support configurable positioning reference signal resource allocation, supporting more flexible resource configuration and improving resource utilization.

To better achieve the foregoing objective, an embodiment of this disclosure further provides a network device. The network device includes a processor, a memory, and a program stored in the memory and capable of running on the processor, where when the processor executes the program, the steps of the foregoing method for configuring a positioning reference signal are implemented. An embodiment of the present invention further provides a computer-readable storage medium, where the computer-readable storage medium stores a program, and when the program is executed by a processor, the steps of the foregoing method for configuring a positioning reference signal are implemented.

Figure 13:
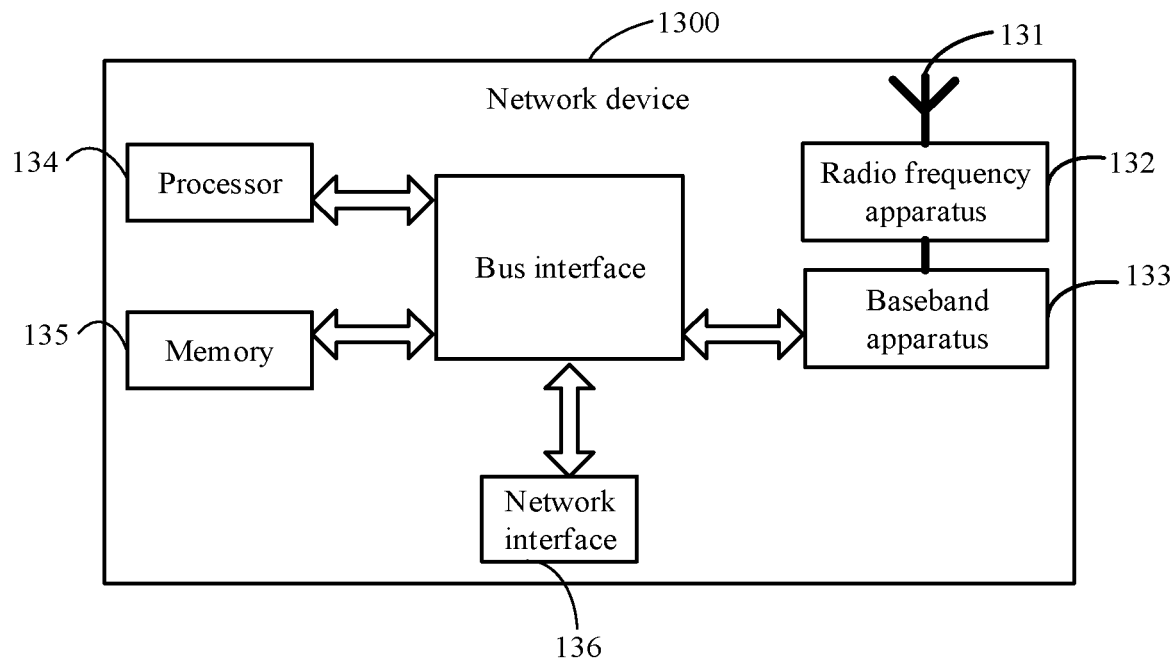
FIG. 13 is a block diagram of a network device according to an embodiment of this disclosure.

Specifically, an embodiment of this disclosure further provides a network device. As shown in FIG. 13, the network device 1300 includes an antenna 131, a radio frequency apparatus 132, and a baseband apparatus 133. The antenna 131 is connected to the radio frequency apparatus 132. In an uplink direction, the radio frequency apparatus 132 receives information by using the antenna 131, and sends the received information to the baseband apparatus 133 for processing. In a downlink direction, the baseband apparatus 133 processes to-be-sent information, and sends the information to the radio frequency apparatus 132; and the radio frequency apparatus 132 processes the received information and then sends the information out by using the antenna 131.

The frequency band processing apparatus may be located in the baseband apparatus 133. The method performed by the network device in the foregoing embodiment may be implemented in the baseband apparatus 133, and the baseband apparatus 133 includes a processor 134 and a memory 135.

The baseband apparatus 133 may include, for example, at least one baseband processing unit, where a plurality of chips are disposed on the baseband processing unit. As shown in FIG. 13, one of the chips is, for example, the processor 134, connected to the memory 135, to invoke a program in the memory 135 to perform the operation of the network device shown in the foregoing method embodiment.

The baseband apparatus 133 may further include a network interface 136, configured to exchange information with the radio frequency apparatus 132, where the interface is, for example, a common public radio interface (CPRI).

Herein, the processor may be one processor, or may be a collective term for a plurality of processing components. For example, the processor may be a CPU, or may be an ASIC, or is configured as one or more integrated circuits for implementing the method performed by the network device, for example, one or more microprocessors DSPs, or one or more field programmable gate arrays FPGAs. A storage component may be a memory, or may be a collective term for a plurality of storage components.

The memory 135 may be a volatile memory or a non-volatile memory, or may include a volatile memory and a non-volatile memory. The non-volatile memory may be a read-only memory ROM), a programmable read only memory (PROM), an erasable programmable read-only memory (EPROM), and an electrically erasable programmable read-only memory (EEPROM), or flash memory. The volatile memory may be a random access memory (RAM), which is used as an external cache. As exemplary rather than restrictive description, many forms of RAM can be used, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct Rambus random access memory (DRRAM). The memory 135 described in this application is intended to include but is not limited to these and any other suitable types of memories.

Specifically, the network device in this embodiment of this disclosure further includes a program stored in the memory 135 and capable of running on the processor 134. The processor 134 invokes the program in the memory 135 to perform the method performed by the modules shown in FIG. 12.

Specifically, when being invoked by the processor 134, the program may be configured to perform the following: transmitting resource configuration information of a positioning reference signal; and transmitting the positioning reference signal based on a resource pattern indicated by the resource configuration information, where the resource configuration information includes at least one parameter item, a value of the parameter item is one of the at least two optional values corresponding to the parameter item, and the resource pattern is related to the value of the parameter item.

The network device in this embodiment of this disclosure configures the resource configuration information of the positioning reference signal for the terminal, and the value of the parameter item in the resource configuration information is one of the at least two optional values that is selected by the network device, so that the system can support configurable positioning reference signal resource allocation, supporting more flexible resource configuration and improving resource utilization.

The foregoing embodiment describes the method for configuring a positioning reference signal from the perspective of the network device side in this disclosure. The following embodiment further describes a method for configuring a positioning reference signal on the terminal side with reference to the accompanying drawings.

Figure 14:
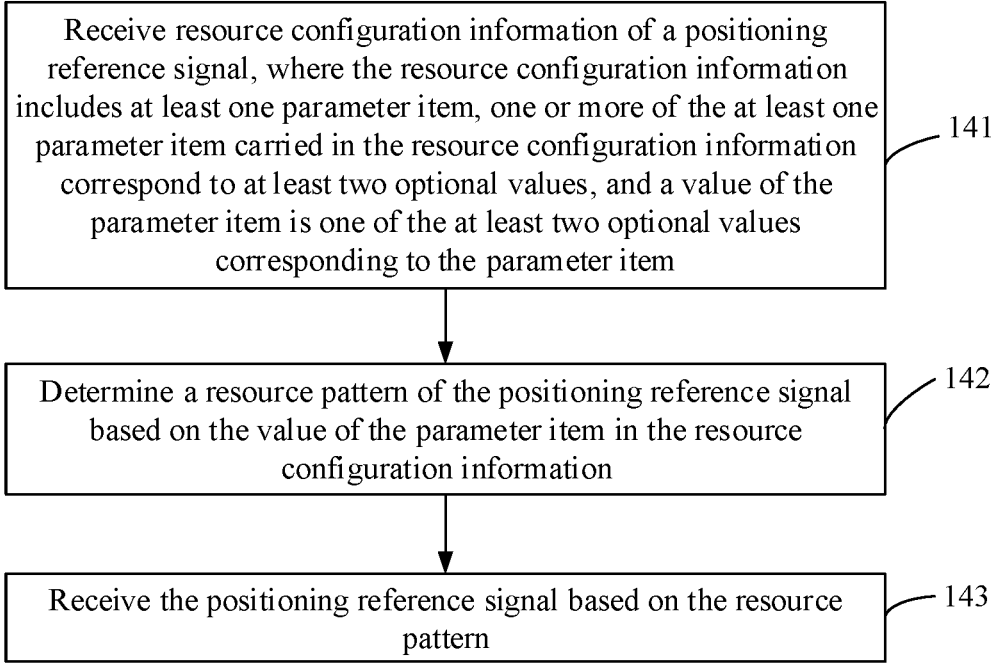
FIG. 14 is a schematic flowchart of a method for configuring a positioning reference signal on a terminal side according to an embodiment of this disclosure.

As shown in FIG. 14, a method for configuring a positioning reference signal according to an embodiment of this disclosure is applied to a terminal, and the method may include the following steps 141 to 143.

Step 141: Receive resource configuration information of a positioning reference signal, where the resource configuration information includes at least one parameter item, and a value of the parameter item is one of at least two optional values corresponding to the parameter item.

The positioning reference signal PRS is used for downlink positioning. After configuring a transmission resource for the positioning reference signal, the network device transmits the resource configuration information of the positioning reference signal to the terminal, where the resource configuration information is used to indicate the transmission resource for the positioning reference signal, such as at least one of a frequency domain resource, a time domain resource, a spatial domain resource, and a code domain resource.

Step 142: Determine a resource pattern of the positioning reference signal based on the value of the parameter item in the resource configuration information.

The resource configuration information may include at least one parameter item related to the transmission resource of the positioning reference signal. A resource pattern, also referred to as a PRS resource pattern, is related to the value of the parameter item, and different values of a parameter item correspond to different resource patterns. After configuring a time-frequency resource for the positioning reference signal, the network device transmits the positioning reference signal by using the corresponding time-frequency resource.

Step 143: Receive the positioning reference signal based on the resource pattern.

After determining the resource pattern based on the resource configuration information, the terminal receives the positioning signal based on the resource pattern, so as to implement subsequent positioning measurement.

The parameter item included in the resource configuration information may include: a frequency density of the resource pattern, and the frequency density is used to indicate that the positioning reference signals are spaced N subcarriers apart in frequency domain, where N is one of first optional values corresponding to the frequency density. That is, the resource pattern of the positioning reference signal is related to the frequency density of the positioning reference signal.

The frequency density may be a frequency density of the positioning reference signal on each physical resource block. The frequency density may be represented by a comb-N structure, indicating that the positioning reference signal is equally spaced N subcarriers apart in frequency domain. N is one of the first optional values corresponding to the frequency density. The first optional value may include at least one of 1, 2, 3, 4, 6, and 12. It is assumed that the first optional value includes 1, 2, 3, 4, 6, and 12, N may be 1, 2, 3, 4, 6, or 12. The frequency density represented by the comb-N structure may be equivalent to a density of 12/N, indicating a quantity of REs equally spaced apart and included in one RB. N=1, 2, 3, 4, 6, or 12 is equivalent to a density of 12, 6, 4, 3, 2, or 1, respectively.

Further, the parameter item in the resource configuration information may further include: a frequency offset between adjacent symbols in the resource pattern, and a second optional value corresponding to the frequency offset is related to the first optional value. That is, the resource pattern of the positioning reference signal is related to the frequency offset between adjacent symbols in the positioning reference signal. The frequency offset may be an RE offset, and a RE position of a symbol in the positioning reference signal may be obtained through calculation based on an RE position of a previous adjacent symbol and a configured RE offset.

The second optional value corresponding to the frequency offset is related to the first optional value corresponding to the frequency density, such as a value of the RE offset (the second optional value) is related to the comb-N structure (the first optional value). Optionally, the second optional value may be a factor of the first optional value, and the second optional value is different from the first optional value.

To be specific, the second optional value may be a value other than the first optional value in the factor of the first optional value, for example, the value of the RE offset may be a factor of N other than N itself. For N being 12 (comb-12), the RE offset may be at least one of 1, 2, 3, 4, and 6; for N being 6 (comb-6), the RE offset may be at least one of 1, 2, and 3; for N being 4 (comb-4), the RE offset may be 1 and/or 2; for N being 3 (comb-3), the RE offset may be 1; for N being 2 (comb-2), the RE offset may be 1; for N being 1 (comb-1), the RE offset is not configured.

Optionally, the frequency offset described in this embodiment of this disclosure may be a positive offset, or the frequency offset may be a negative offset. The positive offset is an offset directing to a higher frequency, and the negative offset is an offset directing to a lower frequency.

Further, in a case that a first frequency position obtained through calculation based on the frequency offset exceeds a frequency range of a resource block RB, a frequency position of the positioning reference signal is a position obtained by performing modulo on the first frequency position based on a specific value. The specific value may be a maximum number of frequency domain granularities contained in an RB. Assuming that a frequency domain granularity is RE, the specific value may be a maximum number of REs contained in an RB, that is, 12. In this way, in a case that a RE position of a symbol obtained through calculation based on the RE offset exceeds a range of one RB, the modulus (mod 12) may be obtained to make the frequency position of the positioning reference signal in the symbol fall within the range of the RB.

Optionally, the parameter item in the resource configuration information may include: the number of symbols included in the resource pattern, used to indicate the number of symbols occupied by the positioning reference signal. In a case that the number of symbols occupied by the positioning reference signal is greater than 1, a plurality of symbols occupied by the positioning reference signal may be continuous or discontinuous.

A third optional value corresponding to the number of symbols may be greater than or equal to a quotient of the first optional value and the second optional value, that is, the number of symbols occupied by the positioning reference signal is not less than N/frequency offset.

Alternatively, the third optional value corresponding to the number of symbols may be less than or equal to a maximum number of symbols in the time domain transmission unit in which the positioning reference signal is located. Using the time domain transmission unit being slot as an example, the number of symbols occupied by the positioning reference signal is not greater than a maximum number of symbols included in the slot.

Alternatively, the third optional value corresponding to the number of symbols is related to a CP type of the positioning reference signal. In other words, the resource pattern of the positioning reference signal is related to the CP type, and the CP type of the positioning reference signal may be configured by the network device. For example, for normal CP, the number of symbols occupied by the positioning reference signal does not exceed a maximum number of symbols included in one time domain transmission unit (such as slot) for normal CP, for example, 14. For extended CP, the number of symbols occupied by the positioning reference signal does not exceed a maximum number of symbols included in one time domain transmission unit (such as slot) for extended CP, for example, 12.

Optionally, the parameter item in the resource configuration information may further include: a position of the first symbol in the resource pattern, used to indicate a position of the first symbol of the positioning reference signal in a time domain transmission unit (such as a slot). A fourth optional value corresponding to the first symbol position falls in a range: a subset or full set of [0, M], where M is difference between the number of symbols included in the resource pattern and the maximum number of symbols in the time domain transmission unit in which the positioning reference signal is located. Using the fourth optional value with a range of [0, M] as an example, the position of the first symbol in the resource pattern may be a position with a symbol sequence number being 0, 1, . . . , M−1, or M.

Optionally, the parameter item in the resource configuration information may further includes a lowest frequency position for the first symbol of the resource pattern, and a fifth optional value corresponding to the lowest frequency position falls in a range: a subset or full set of [0, N−1]. In other words, the lowest position of the positioning reference signal in frequency domain in the first symbol is related to the comb-N structure. Using the range of the fifth optional value being [0, N−1] as an example, the lowest frequency position in the first symbol of the resource pattern may be a position with a RE number of 0, 1, . . . , N−2, or N−1. For example, the frequency density is 6, and the lowest frequency position is one of 0 to 5.

Similar to the embodiment on the network device side, the resource configuration information may include at least one of the frequency density of the positioning reference signal, the frequency offset (such as RE offset) between the adjacent symbols of the positioning reference signal, the number of symbols occupied by the positioning reference signal, the position of the first symbol occupied by the positioning reference signal, the lowest frequency position in the first symbol occupied by the positioning reference signal, and the like. In the parameter items included in the resource configuration information, there is at least one parameter item corresponding to a plurality of optional values, and different resource patterns are determined based on different values of the parameter item. Those skilled in the art can understand that the resource patterns determined by the foregoing configuration manners of the resource configuration information all belong to the embodiments of this disclosure. Examples are not described one by one herein.

The positioning reference signal in this embodiment of this disclosure may occupy one symbol, or may occupy a plurality of symbols. When the positioning reference signal occupies a plurality of symbols, the occupied plurality of symbols may be continuous or discontinuous. That is, when the resource pattern includes more than two symbols, these symbols may be continuous or discontinuous.

In a case that the resource pattern includes at least two discontinuous symbols, the resource pattern occupies at least one resource element RE on every P subcarriers, where P is 1, 2, or 3. That is, in a resource pattern with discontinuous symbols, there is at least one RE on each subcarrier of a PRB in which the resource pattern is located. Alternatively, in a resource pattern with discontinuous symbols, there is at least one RE on every two or three subcarriers of a PRB in which the resource pattern is located.

Optionally, in a case that the resource pattern includes at least two discontinuous symbols, the symbols included in the resource pattern are equally spaced apart, that is, the symbols occupied by the positioning reference signal may be equally spaced apart in time domain.

Optionally, in a case that the resource pattern includes at least two discontinuous symbols, a resource pattern for the at least two discontinuous symbols is obtained by truncating a resource pattern in continuous symbols. That is, the resource pattern with discontinuous symbols may be obtained by truncating the resource pattern with continuous symbols in time domain.

The resource configuration information in this embodiment of this disclosure may include not only the parameter items for determining the resource pattern described above, but also include indication information indicating different ports. The resource pattern may correspond to one port, or correspond to at least two ports. In a case that the resource patterns correspond to at least two ports, resource patterns on different ports may be the same, or the resource patterns on different ports may be time-division multiplexed, or the resource patterns on different ports are frequency-division multiplexed. That is, the resource pattern of the positioning reference signal is related to port information of the positioning reference signal. If the positioning reference signal is configured with more than one port, the resource patterns of different ports may be the same or frequency-division multiplexed or time-division multiplexed.

This embodiment of this disclosure describes a relationship between resource patterns on different ports and resource configuration information related to the resource patterns. It should be noted that the resource pattern determined based on the resource configuration information may be determined based on values of parameter items in one set of resource configuration information, or may be determined based on values of parameter items in a plurality of sets of resource configuration information. Using a plurality of sets as an example, the resource pattern includes at least two resource subpatterns, and the at least two resource subpatterns are related to the value of the parameter item. In other words, one resource subpattern can be determined based on the values of the parameter items in one set of resource configuration information.

In this embodiment of this disclosure, frequency offsets of resource patterns in different cells are different. Specifically, the resource patterns of the positioning reference signal in different cells may be distinguished by frequency offset, where the frequency offset is a per-RE offset, and a value of frequency offset is related to a cell ID.

In this embodiment of this disclosure, resource patterns in different cells are time-division multiplexed. Specifically, the resource patterns of the positioning reference signal in different cells may be time-division multiplexed. For example, the resource patterns of the positioning reference signal in different cells may occupy different symbols or slots.

The cell described in this embodiment of this disclosure may be a physical cell or a virtual cell. The cell ID may be at least one of a physical cell ID, a reception point ID, a transmission point ID, a global cell ID, and the like.

In the method for configuring a positioning reference signal in this embodiment of this disclosure, the terminal receives the resource configuration information of the positioning reference signal from the network device, and the value of the parameter item in the resource configuration information is one of the at least two optional values that is selected by the network device, so that the system can support configurable positioning reference signal resource allocation, supporting more flexible resource configuration and improving resource utilization.

The foregoing embodiment describes the method for configuring a positioning reference signal in different scenarios, and the following further describes a terminal corresponding to the method with reference to the accompanying drawings.

Figure 15:
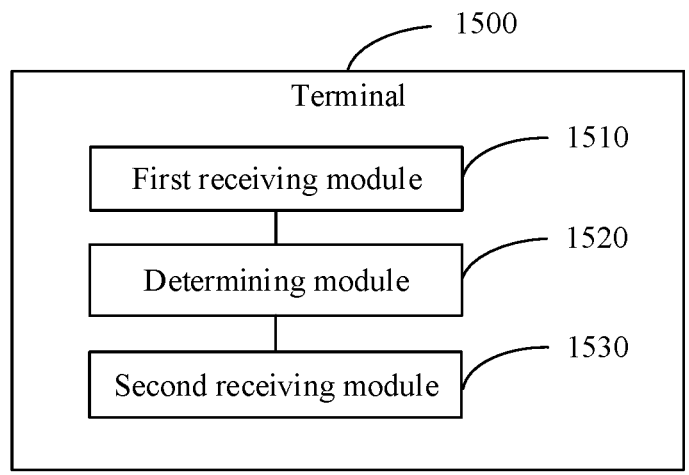
FIG. 15 is a schematic diagram of a modular structure of a terminal according to an embodiment of this disclosure.

As shown in FIG. 15, a terminal 1500 in an embodiment of this disclosure is capable of implementing details of the foregoing method embodiment, with the same effects achieved: receiving resource configuration information of a positioning reference signal, where the resource configuration information includes at least one parameter item, and a value of the parameter item is one of at least two optional values corresponding to the parameter item; determining a resource pattern of the positioning reference signal based on the value of the parameter item in the resource configuration information; and receiving the positioning reference signal based on the resource pattern. The terminal 1500 specifically includes the following functional modules:

a first receiving module 1510, configured to receive resource configuration information of a positioning reference signal, where the resource configuration information includes at least one parameter item, and a value of the parameter item is one of at least two optional values corresponding to the parameter item;

a determining module 1520, configured to determine a resource pattern of the positioning reference signal based on the value of the parameter item in the resource configuration information; and a second receiving module 1530, configured to receive the positioning reference signal based on the resource pattern.

Optionally, the parameter item includes: a frequency density of the resource pattern, and the frequency density is used to indicate that the positioning reference signals are spaced N subcarriers apart in frequency domain, where N is one of first optional values corresponding to the frequency density.

Optionally, the first optional value includes: at least one of 1, 2, 3, 4, 6, and 12.

Optionally, the parameter item further includes: a frequency offset between adjacent symbols in the resource pattern, and a second optional value corresponding to the frequency offset is related to the first optional value.

Optionally, the second optional value is a factor of the first optional value, and the second optional value is different from the first optional value.

Optionally, the frequency offset is a positive offset, or the frequency offset is a negative offset.

Optionally, in a case that a first frequency position obtained through calculation based on the frequency offset exceeds a frequency range of a resource block RB, a frequency position of the positioning reference signal is a position obtained by performing modulo on the first frequency position based on a specific value.

Optionally, the parameter item further includes the number of symbols included in the resource pattern, and a third optional value corresponding to the number of symbols is greater than or equal to a quotient of the first optional value and the second optional value.

Optionally, the parameter item includes the number of symbols included in the resource pattern, and a third optional value corresponding to the number of symbols is less than or equal to a maximum number of symbols in a time domain transmission unit in which the positioning reference signal is located.

Optionally, the parameter item includes the number of symbols included in the resource pattern, and a third optional value corresponding to the number of symbols is related to a cyclic prefix CP type of the positioning reference signal.

Optionally, the parameter item further includes a position of the first symbol of the resource pattern, and a range of a fourth optional value corresponding to the position of the first symbol is [0, M], where M is a difference between the number of symbols included in the resource pattern and the maximum number of symbols in the time domain transmission unit in which the positioning reference signal is located.

Optionally, the parameter item further includes a lowest frequency position for the first symbol of the resource pattern, and a fifth optional value corresponding to the lowest frequency position falls in a range of [0, N−1].

Optionally, in a case that the resource patterns correspond to at least two ports, resource patterns on different ports are the same, or the resource patterns on different ports are time-division multiplexed, or the resource patterns on different ports are frequency-division multiplexed.

Optionally, in a case that the resource patterns on different ports are the same, positioning reference signals on different ports have different a generation sequences, or frequency domain orthogonal covering codes for the positioning reference signals on different ports are different.

Optionally, an initial value of the generation sequence is related to a port number of the port.

Optionally, in a case that the resource pattern includes at least two discontinuous symbols, the resource pattern occupies at least one resource element RE on every P subcarriers, where P is 1, 2, or 3.

Optionally, in a case that the resource pattern includes at least two discontinuous symbols, symbols contained in the resource pattern are equally spaced apart.

Optionally, in a case that the resource pattern includes at least two discontinuous symbols, a resource pattern for the at least two discontinuous symbols is obtained by truncating a resource pattern in continuous symbols.

Optionally, the resource pattern includes at least two resource subpatterns, and the at least two resource subpatterns are related to the value of the parameter item.

Optionally, frequency offsets of resource patterns in different cells are different.

Optionally, resource patterns in different cells are time-division multiplexed.

It should be noted that the terminal in this embodiment of this disclosure receives the resource configuration information of the positioning reference signal from the network device, and the value of the parameter item in the resource configuration information is one of the at least two optional values that is selected by the network device, so that the system can support configurable positioning reference signal resource allocation, supporting more flexible resource configuration and improving resource utilization.

It should be noted that, it should be understood that division of modules of the network device and the terminal is merely logical function division. The modules may be all or partially integrated in a physical entity or may be separated physically in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processing component, or by using instructions in a form of software.

For example, the foregoing modules may be configured as one or more integrated circuits that implement the foregoing methods, such as one or more application-specific integrated circuits (ASIC), one or more microprocessors (DSP), or one or more field programmable gate arrays (FPGA). For another example, when one of the foregoing modules is implemented by invoking program code by the processing element, the processing element may be a general-purpose processor, such as a central processing unit (CPU), or another processor that can invoke the program code. For still another example, these modules may be integrated together and implemented in a system-on-a-chip (SOC) form.

Figure 16:
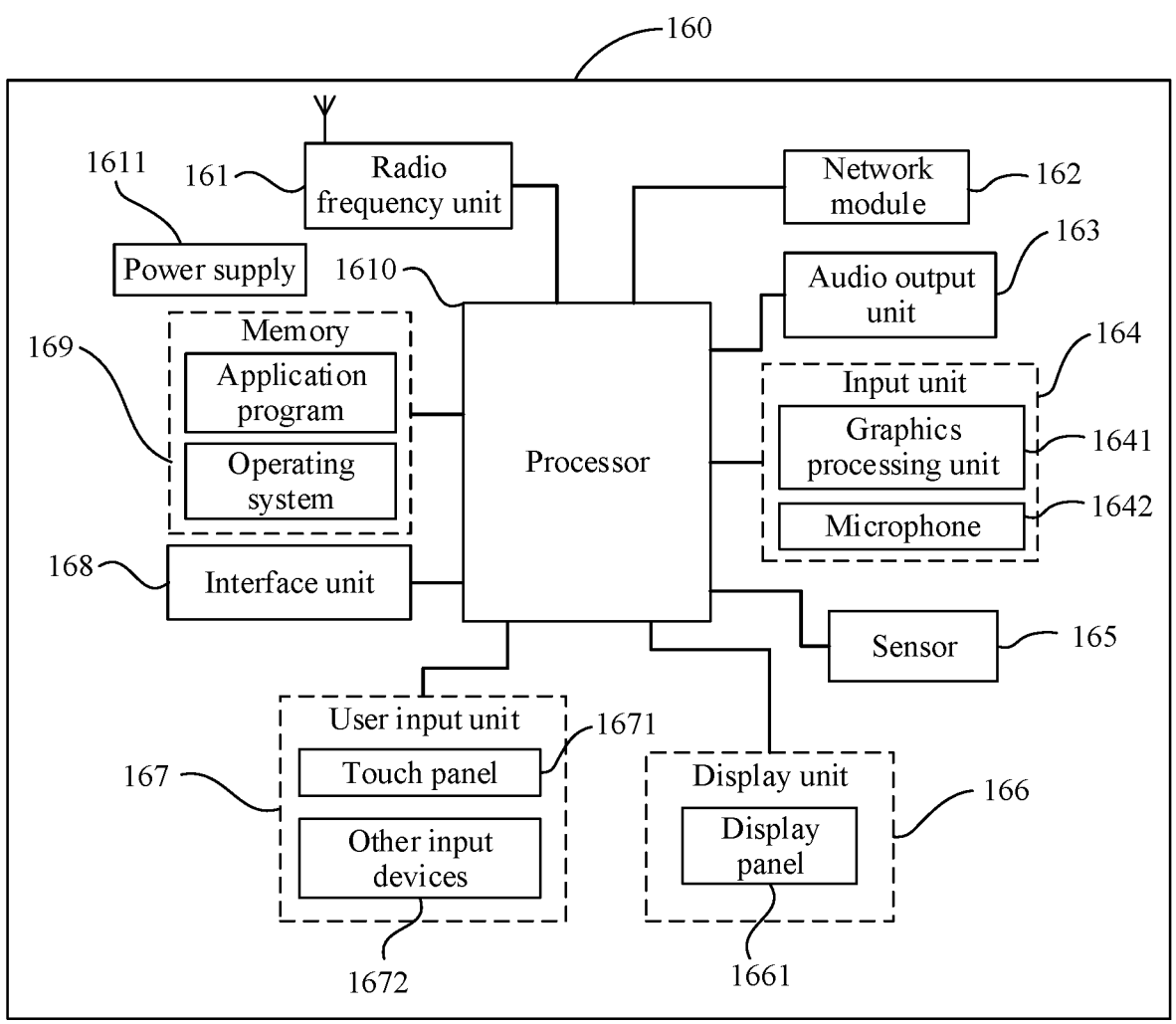
FIG. 16 is a block diagram of a terminal according to an embodiment of this disclosure.

To better achieve the foregoing objective, further, FIG. 16 is a schematic diagram of a hardware structure of a terminal for implementing each embodiment of this disclosure. The terminal 160 includes but is not limited to components such as a radio frequency unit 161, a network module 162, an audio output unit 163, an input unit 164, a sensor 165, a display unit 166, a user input unit 167, an interface unit 168, a memory 169, a processor 1610, and a power supply 1611. A person skilled in the art may understand that the structure of the terminal shown in FIG. 16 does not constitute any limitation on the terminal device. The terminal may include more or fewer components than those shown in the figure, or a combination of some components, or the components disposed differently. In this embodiment of this disclosure, the terminal includes but is not limited to a mobile phone, a tablet computer, a notebook computer, a palmtop computer, an in-vehicle terminal, a wearable device, a pedometer, or the like.

The radio frequency unit 161 is configured to receive resource configuration information of a positioning reference signal, where the resource configuration information includes at least one parameter item, and a value of the parameter item is one of at least two optional values corresponding to the parameter item.

The processor 1610 is configured to determine a resource pattern of the positioning reference signal based on the value of the parameter item in the resource configuration information.

The radio frequency unit 161 is configured to receive the positioning reference signal based on the resource pattern.

The terminal in this embodiment of this disclosure receives the resource configuration information of the positioning reference signal from the network device, and the value of the parameter item in the resource configuration information is one of the at least two optional values that is selected by the network device, so that the system can support configurable positioning reference signal resource allocation, supporting more flexible resource configuration and improving resource utilization.

It should be understood that, in this embodiment of this disclosure, the radio frequency unit 161 may be configured to: receive and transmit signals in an information receiving/transmitting process or a call process; and specifically, after receiving downlink data from a base station, transmit the downlink information to the processor 1610 for processing, and in addition, transmit uplink data to the base station. Generally, the radio frequency unit 161 includes but is not limited to an antenna, at least one amplifier, a transceiver, a coupler, a low noise amplifier, a duplexer, and the like. In addition, the radio frequency unit 161 may also communicate with a network and other devices via a wireless communications system.

The terminal provides a user with wireless broadband internet access through the network module 162, for example, helping the user to transmit and receive e-mails, browse web pages, and access streaming media.

The audio output unit 163 may convert audio data received by the radio frequency unit 161 or the network module 162 or stored in the memory 169 into an audio signal and output the audio signal as a sound. Furthermore, the audio output unit 163 may also provide audio output (for example, a call signal received sound or a message received sound) related to a specific function performed by the terminal 160. The audio output unit 163 includes a speaker, a buzzer, a receiver, and the like.

The input unit 164 is configured to receive an audio or video signal. The input unit 164 may include a graphics processing unit (GPU) 1641 and a microphone 1642. The graphics processing unit 1641 processes image data of a still picture or video obtained by an image capture apparatus (such as a camera) in a video capture mode or an image capture mode. A processed image frame may be displayed on the display unit 166. The image frame processed by the graphics processing unit 1641 may be stored in the memory 169 (or another storage medium) or be transmitted by the radio frequency unit 161 or the network module 162. The microphone 1642 is capable of receiving sounds and processing such sounds into audio data. The processed audio data may be converted in a telephone call mode into a format that can be transmitted by the radio frequency unit 161 to a mobile communications base station, for outputting.

The terminal 160 may further include at least one sensor 165, for example, an optical sensor, a motion sensor, and other sensors. Specifically, the optical sensor may include an ambient light sensor and a proximity sensor. The ambient light sensor may adjust luminance of the display panel 1661 based on brightness of ambient light, and the proximity sensor may turn off the display panel 1661 and/or backlight when the terminal 160 moves close to an ear. As a type of motion sensor, an accelerometer sensor can detect magnitudes of accelerations in all directions (usually three axes), can detect a magnitude and a direction of gravity when the mobile phone is in a static state, and can be applied to posture recognition (such as screen switching between portrait and landscape, related games, and magnetometer posture calibration) of the terminal, functions related to vibration recognition (such as pedometer and tapping), and the like. The sensor 165 may also include a fingerprint sensor, a pressure sensor, an iris sensor, a molecular sensor, a gyroscope, a barometer, a hygrometer, a thermometer, an infrared sensor, and the like. Details are not described herein.

The display unit 166 is configured to display information input by the user or information provided to the user. The display unit 166 may include a display panel 1661, and the display panel 1661 may be configured in a form of a liquid crystal display (LCD), an organic light-emitting diode (OLED), or the like.

The user input unit 167 may be configured to receive input digit or character information and generate key signal input related to user setting and function control of the mobile terminal. Specifically, the user input unit 167 may include a touch panel 1671 and other input devices 1672. The touch panel 1671 is also referred to as a touchscreen and can collect a touch operation (such as an operation performed by the user on the touch panel 1671 or near the touch panel 1671 with a finger or by using any proper object or accessory such as a stylus) of the user on or near the touch panel 1671. The touch panel 1671 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 1610, and can receive a command transmitted by the processor 1610 and execute the command. In addition, the touch panel 1671 may be implemented in a plurality of forms, for example, as a resistive, capacitive, infrared, or surface acoustic wave touch panel. In addition to the touch panel 1671, the user input unit 167 may further include other input devices 1672. Specifically, the other input devices 1672 may include but are not limited to a physical keyboard, a function key (such as a volume control key or an on/off key), a trackball, a mouse, and a joystick. Details are not described herein.

Further, the touch panel 1671 may cover the display panel 1661. When detecting a touch operation on or near the touch panel 1671, the touch panel 1671 transmits the touch operation to the processor 1610 to determine a type of a touch event. Then, the processor 1610 provides a corresponding visual output on the display panel 1661 based on the type of the touch event. Although in FIG. 16, the touch panel 1671 and the display panel 1661 act as two independent parts to implement input and output functions of the terminal, in some embodiments, the touch panel 1671 and the display panel 1661 may be integrated to implement the input and output functions of the terminal. This is not specifically limited herein.

The interface unit 168 is an interface between an external apparatus and the terminal 160. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 168 may be configured to: receive input (for example, data information and power)

from the external apparatus, and transmit the received input to one or more elements in the terminal 160, or may be configured to transmit data between the terminal 160 and the external apparatus.

The memory 169 may be configured to store software programs and various data. The memory 169 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 169 may include a high-speed random access memory, and may further include a non-volatile memory such as at least one disk storage device, a flash memory device, or another non-volatile solid-state storage device.

The processor 1610 is a control center of the terminal, and is connected to all components of the terminal by using various interfaces and lines. By running or executing a software program and/or module that is stored in the memory 169 and calling data stored in the memory 169, the processor 1610 executes various functions of the terminal and processes data, so as to perform overall monitoring on the terminal. The processor 1610 may include one or more processing units. Optionally, the processor 1610 may integrate an application processor and a modem processor. The application processor mainly processes the operating system, a user interface, an application program, and the like. The modem processor mainly processes wireless communication. It can be understood that the modem processor may alternatively be not integrated in the processor 1610.

The terminal 160 may further include the power supply 1611 (such as a battery) supplying power to each component. Optionally, the power supply 1611 may be logically connected to the processor 1610 by using a power management system, so that functions such as charge and discharge management and power consumption management are implemented by using the power management system.

In addition, the terminal 160 includes some functional modules that are not shown. Details are not described herein.

Optionally, an embodiment of this disclosure further provides a terminal, including a processor 1610, a memory 169, and a computer program stored in the memory 169 and running on the processor 1610. When the computer program is executed by the processor 1610, the processes of the foregoing embodiment of the method for configuring a positioning reference signal can be implemented, with the same technical effects achieved. To avoid repetition, details are not described herein again. The terminal may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, or a user device, which is not limited herein.

An embodiment of this disclosure further provides a computer-readable storage medium, where the computer-readable storage medium stores a program. When the program is executed by a processor, the processes of the foregoing embodiment of the method for configuring a positioning reference signal are implemented, with the same technical effects achieved. To avoid repetition, details are not described herein again. The computer-readable storage medium is, for example, a read-only memory (ROM), a random access memory (RAM), a magnetic disk, or an optical disc.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be embodied in a form of a software product. The computer software product is stored in a storage medium, and includes several instructions for instructing a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of a computing apparatus. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are merely optional implementations of this disclosure. It should be noted that persons of ordinary skill in the art may make several improvements or polishing without departing from the principle of this disclosure and the improvements and polishing shall fall within the protection scope of this disclosure.

The invention claimed is:

1. A method for configuring a positioning reference signal, applied to a network device side and comprising:
transmitting resource configuration information of a positioning reference signal; and
transmitting the positioning reference signal based on a resource pattern indicated by the resource configuration information, wherein the resource configuration information comprises at least one parameter item, one or more of the at least one parameter item carried in the resource configuration information correspond to at least two optional values, a value of the parameter item is one of the at least two optional values corresponding to the parameter item, and the resource pattern is related to the value of the parameter item,
wherein the parameter item comprises the number of symbols comprised in the resource pattern, and a third optional value corresponding to the number of symbols is less than or equal to a maximum number of symbols in a time domain transmission unit in which the positioning reference signal is located.

2. The method for configuring a positioning reference signal according to claim 1, wherein the parameter item comprises: a frequency density of the resource pattern, and the frequency density is used to indicate that the positioning reference signals are spaced N subcarriers apart in frequency domain, wherein N is one of first optional values corresponding to the frequency density.

3. The method for configuring a positioning reference signal according to claim 2, wherein the first optional value comprises at least one of: 1, 2, 3, 4, 6, and 12.

4. The method for configuring a positioning reference signal according to claim 2, wherein the parameter item further comprises: a frequency offset between adjacent symbols in the resource pattern, and a second optional value corresponding to the frequency offset is related to the first optional value.

5. The method for configuring a positioning reference signal according to claim 4, wherein the second optional value is a factor of the first optional value, and the second optional value is different from the first optional value.

6. The method for configuring a positioning reference signal according to claim 4, wherein the frequency offset is a positive offset, or the frequency offset is a negative offset.

7. The method for configuring a positioning reference signal according to claim 4, wherein in a case that a first frequency position obtained through calculation based on the frequency offset exceeds frequency range of a resource block (RB), a frequency position of the positioning reference signal is a position obtained by performing modulo on the first frequency position based on a specific value.

8. The method for configuring a positioning reference signal according to claim 4, wherein the third optional value corresponding to the number of symbols is greater than or equal to a quotient of the first optional value and the second optional value.

9. The method for configuring a positioning reference signal according to claim 8, wherein the parameter item further comprises a position of the first symbol in the resource pattern, and a range of a fourth optional value corresponding to the position of the first symbol is [0, M], wherein M is a difference between the number of symbols comprised in the resource pattern and the maximum number of symbols in the time domain transmission unit in which the positioning reference signal is located.

10. The method for configuring a positioning reference signal according to claim 2, wherein the parameter item further comprises a lowest frequency position for the first symbol in the resource pattern, and a fifth optional value corresponding to the lowest frequency position falls in a range of [0, N−1].

11. The method for configuring a positioning reference signal according to claim 1, wherein the third optional value corresponding to the number of symbols is related to a cyclic prefix (CP) type of the positioning reference signal.

12. The method for configuring a positioning reference signal according to claim 1, wherein in a case that the resource pattern comprises at least two discontinuous symbols, the resource pattern occupies at least one resource element RE on every P subcarriers, wherein P is 1, 2, or 3; or wherein in a case that the resource pattern comprises at least two discontinuous symbols, symbols contained in the resource pattern are equally spaced apart; or wherein in a case that the resource pattern comprises at least two discontinuous symbols, a resource pattern for the at least two discontinuous symbols is obtained by truncating a resource pattern for continuous symbols.

13. The method for configuring a positioning reference signal according to claim 1, wherein in a case that the resource patterns correspond to at least two ports, resource patterns on different ports are the same, or the resource patterns on different ports are time-division multiplexed, or the resource patterns on different ports are frequency-division multiplexed.

14. The method for configuring a positioning reference signal according to claim 13, wherein in a case that the resource patterns on different ports are the same, generation sequences for positioning reference signals on different ports are different, or frequency domain orthogonal covering codes for the positioning reference signals on different ports are different.

15. The method for configuring a positioning reference signal according to claim 14, wherein an initial value of the generation sequence is related to a port number of the port.

16. The method for configuring a positioning reference signal according to claim 1, wherein the resource pattern comprises at least two resource subpatterns, and the at least two resource subpatterns are related to the value of the parameter item; or wherein frequency offsets of resource patterns in different cells are different; or wherein resource patterns in different cells are time-division multiplexed.

17. A method for configuring a positioning reference signal, applied to a terminal and comprising:

receiving resource configuration information of a positioning reference signal, wherein the resource configuration information comprises at least one parameter item, one or more of the at least one parameter item carried in the resource configuration information correspond to at least two optional values, and a value of the parameter item is one of the at least two optional values corresponding to the parameter item;

determining a resource pattern of the positioning reference signal based on the value of the parameter item in the resource configuration information; and receiving the positioning reference signal based on the resource pattern, wherein the parameter item comprises the number of symbols comprised in the resource pattern, and a third optional value corresponding to the number of symbols is less than or equal to a maximum number of symbols in a time domain transmission unit in which the positioning reference signal is located.

18. A terminal, wherein the terminal comprises a processor, a memory, and a program stored in the memory and capable of running on the processor, wherein when executing the program, the processor is configured to:

receive resource configuration information of a positioning reference signal, wherein the resource configuration information comprises at least one parameter item, one or more of the at least one parameter item carried in the resource configuration information correspond to at least two optional values, and a value of the parameter item is one of the at least two optional values corresponding to the parameter item;

determine a resource pattern of the positioning reference signal based on the value of the parameter item in the resource configuration information; and receive the positioning reference signal based on the resource pattern, wherein the parameter item comprises the number of symbols comprised in the resource pattern, and a third optional value corresponding to the number of symbols is less than or equal to a maximum number of symbols in a time domain transmission unit in which the positioning reference signal is located.

19. The terminal according to claim 18, wherein the parameter item comprises: a frequency density of the resource pattern, and the frequency density is used to indicate that the positioning reference signals are spaced N subcarriers apart in frequency domain, wherein N is one of first optional values corresponding to the frequency density.

* * * * *